Oct. 6, 1936. J. S. PECKER 2,056,885
CENTRIFUGAL SEPARATING MACHINE
Filed Feb. 21, 1934 7 Sheets-Sheet 1

INVENTOR
Joseph S. Pecker
BY
ATTORNEY

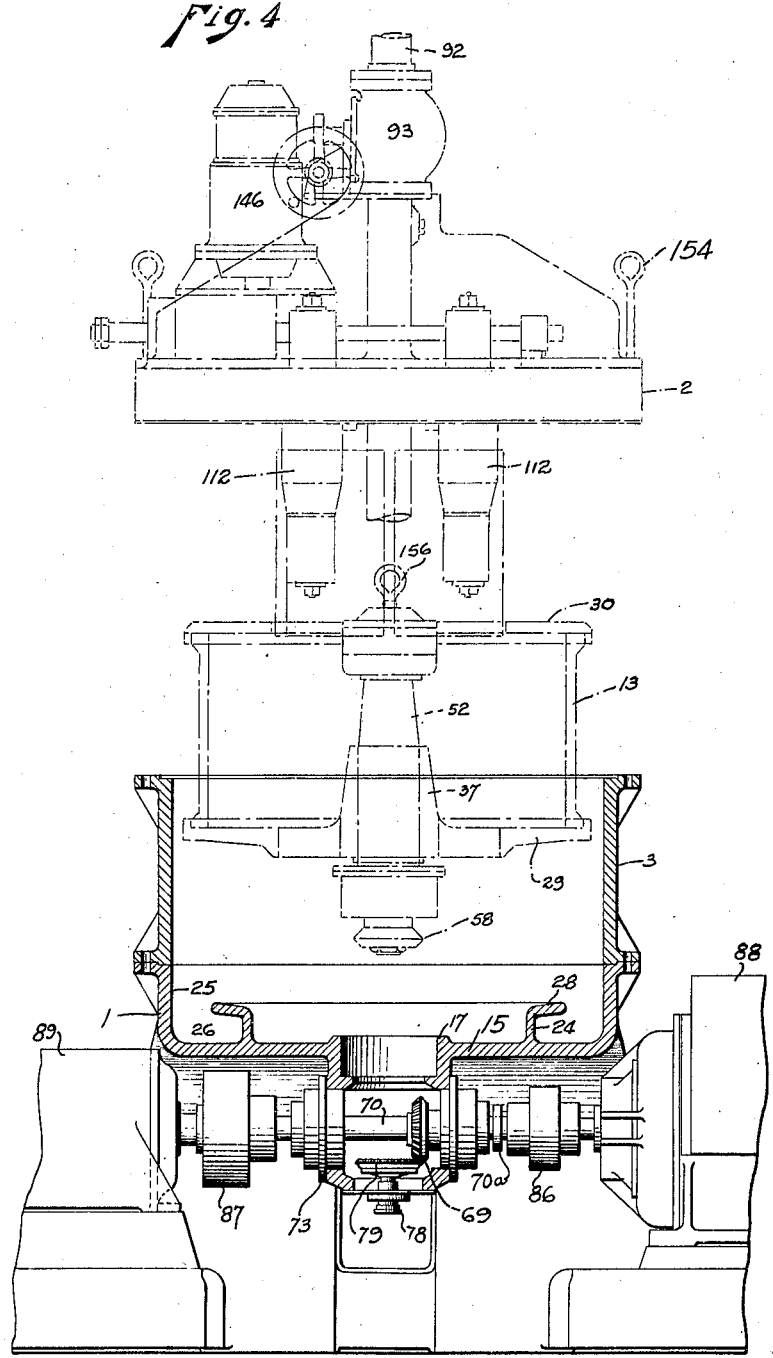

Oct. 6, 1936.   J. S. PECKER   2,056,885
CENTRIFUGAL SEPARATING MACHINE
Filed Feb. 21, 1934   7 Sheets-Sheet 5
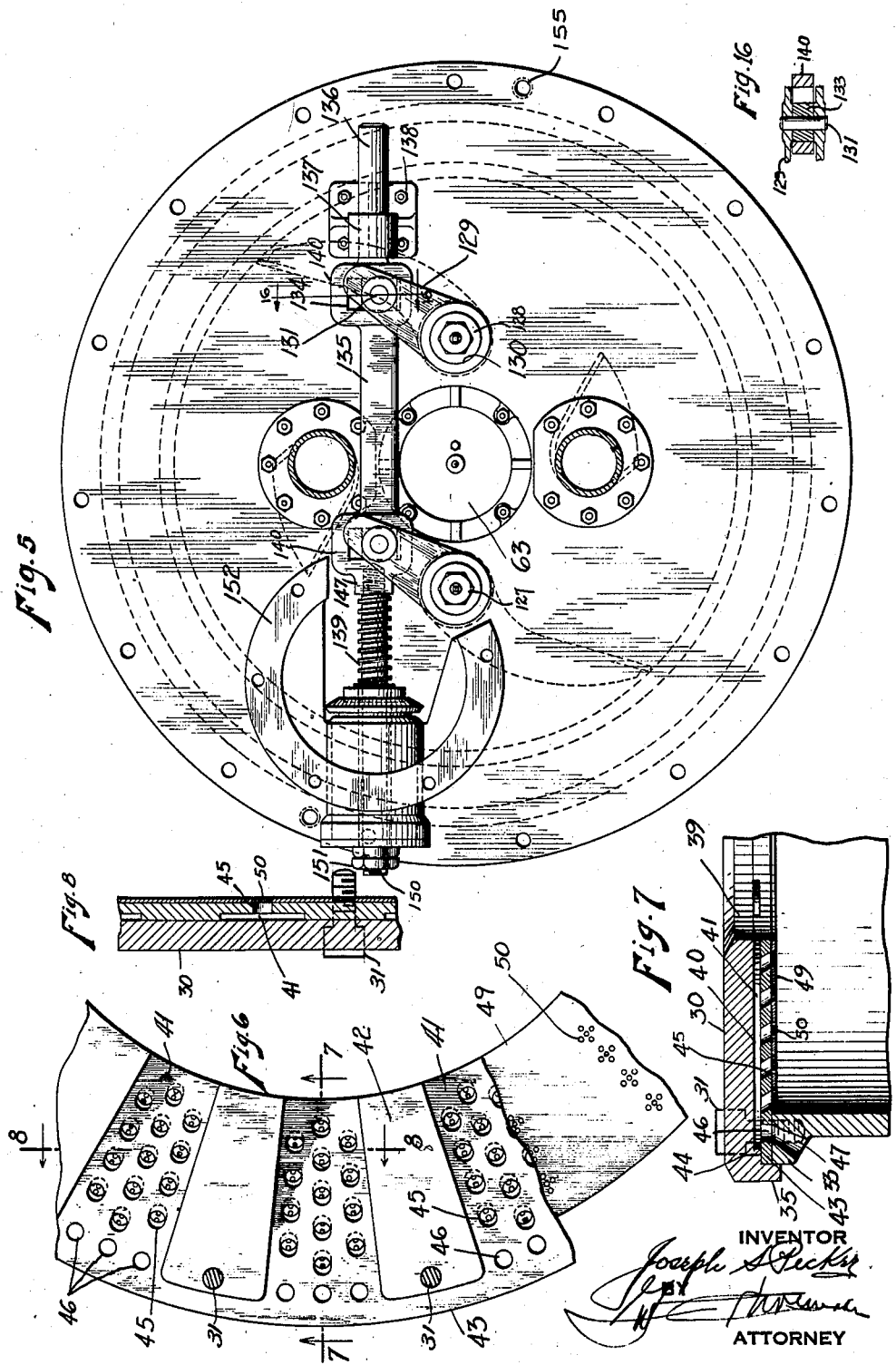

Oct. 6, 1936.   J. S. PECKER   2,056,885
CENTRIFUGAL SEPARATING MACHINE
Filed Feb. 21, 1934   7 Sheets-Sheet 6

INVENTOR
Joseph S. Pecker
BY
ATTORNEY

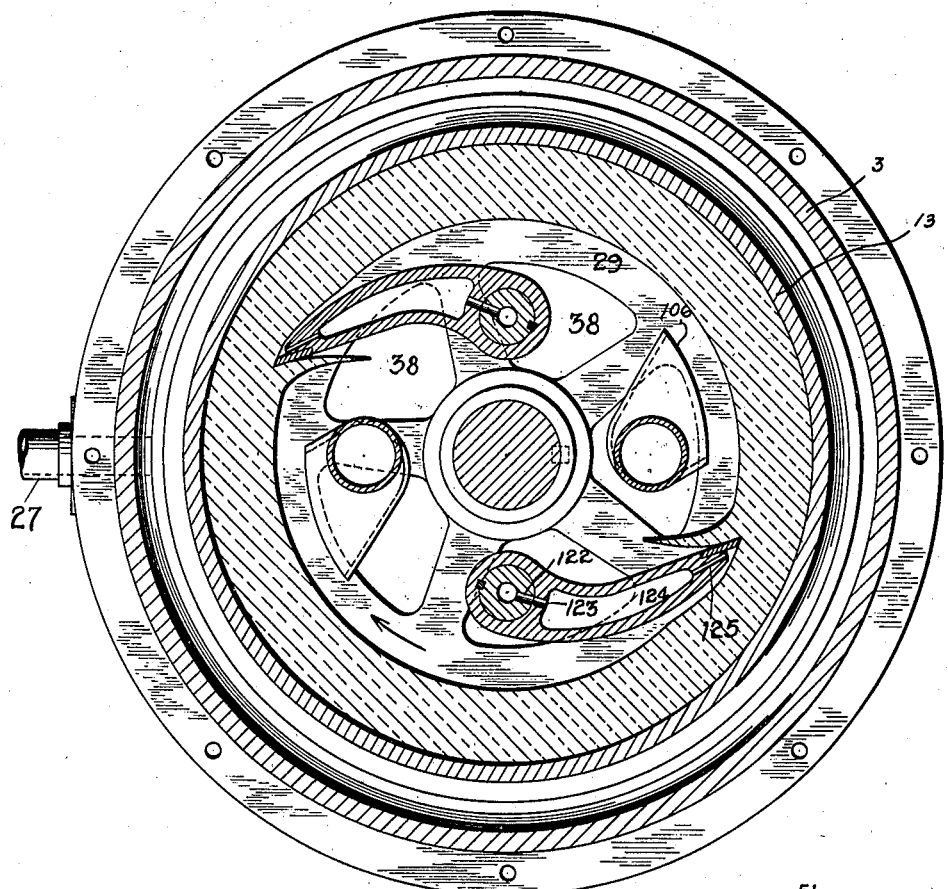
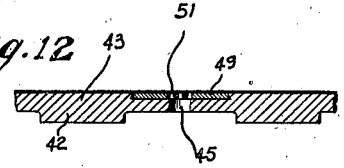
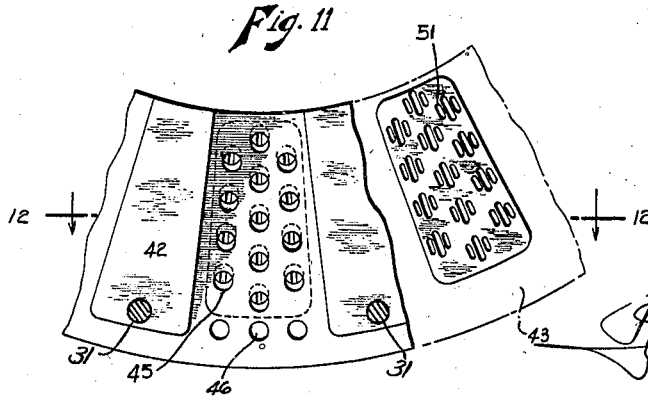

Patented Oct. 6, 1936

2,056,885

UNITED STATES PATENT OFFICE 2,056,885

CENTRIFUGAL SEPARATING MACHINE

Joseph S. Pecker, Philadelphia, Pa., assignor to American Centrifugal Corporation, New York, N. Y., a corporation of Delaware Application February 21, 1934, Serial No. 712,390

75 Claims. (Cl. 210—63)

The invention relates to a centrifugal machine for separating liquids from solids by centrifugal action.

The object of the present invention is to provide a centrifugal separating machine adapted for operating on various materials for separting liquids from solids by centrifugal action and equipped with a rotary centrifugal basket and means for operating the same at high and low speeds for purging at high speed and for unloading purged material at low speed.

A further object of the invention is to provide a centrifugal separating machine of this character adapted to feed sewage or other material to the basket automatically, rotate the basket at high speed during a predetermined period for effecting the purging operation and cleaning or unloading the basket at low speed during another period of the cycle of the operation of the machine whereby the machine will be capable of automatic and continuous operation.

Another object of the invention is to provide feeding means for the material divided to form two branches arranged to discharge the material into the centrifugal basket at substantially diametrically opposite points whereby the material may be delivered uniformly and rapidly to the centrifugal basket and the time limit of the cycle of operation correspondingly decreased and the effectiveness of the operation of the basket increased.

A further object of the invention is to provide a centrifugal separating machine designed to be arranged over a pit for the reception of the sludge and adapted to receive at the top the material to be dewatered and of automatically feeding the material to the centrifugal basket and of controlling the flow of material to the said basket and by such arrangement utilize gravity both in the feeding of the material to the basket and in the discharge or unloading of the sludge from the basket after the same has been dewatered.

Another object of the invention is to provide a base structure equipped with means for bracing the base structure and for also shielding or protecting a part of the operating mechanism from the discharged sludge to prevent the sludge from accumulating on the same or in any wise affecting the operation of the operating mechanism.

A further object of the invention is to equip the machine with a centrifugal basket having imperforate side walls and provided at the top with means for permitting a free discharge of the separated liquid throughout the entire purging operation unaffected by and not dependent on the quantity of sludge accumulating on the side walls of the centrifugal basket so that the liquid will be carried away and discharged from the basket as it is separated from the sludge by the centrifugal action of the basket.

A further object of the invention resides in the provision of a centrifugal separating machine, embodying among other characteristics, means for feeding materials to the basket including a pipe or the like which extends into the basket and terminates adjacent the bottom thereof and provided with a discharge end disposed radially of the basket and which is contracted vertically and distended laterally to effect spreading of the material over the bottom of the basket toward the side walls of the basket.

A further object is to provide means for introducing chemicals and other sludge treating substances into the feed pipe prior to the delivery of the material to the bottom of the basket so that the turbulence set up in the basket incident to rotation thereof effects a thorough commingling of the sludge treating substances with the sludge material prior to separation of the liquids and solids.

It is also an object of the invention to discharge the water radially and in a downward direction from the basket and to screen the water with means adapted to avoid the interlocking of long fibers straddling any two of the screen apertures.

Another object of the invention is to equip the centrifugal machine with scrapers for cleaning the sludge from the centrifugal basket adapted to fold concentrically at the center of the machine and movable radially and in the direction of the rotation of the basket into the path of the material to be cut whereby the rotation of the basket will be utilized in assisting the engaging of the cutters with the sludge and the feeding of the cutters into the same while removing the sludge from the basket.

Another object of the invention is to provide a centrifugal machine having means for enabling air, steam or chemicals to be readily injected into the sludge feeding passages for mechanical agitation or chemical treatment of the material operated on by the machine.

Another object of the invention is to provide hollow shafting and scrapers adapted to permit air or other fluid medium under pressure to be introduced into the scrapers and discharged therefrom for the purpose of cleaning the scraping edges of the scrapers and at the same time cleaning the inside surface of the basket after the major part of the sludge has been removed from the same.

A further object of the invention is to provide a centrifugal separating machine having a centrifugal basket removable as a unit and also means for feeding material to the basket and for cleaning and unloading the basket of dewatered or purged material removable as a unit from the machine independently of the centrifugal basket unit so that both the feeding and cleaning unit and the basket unit may be removed or only the feeding and cleaning unit when desired.

Another object of the invention is to provide a centrifugal separating machine designed to operate at high and low speeds without undue strains or jerky or jarring actions on the various parts of the machine at or during the time of change from one speed to the other.

Another object of the invention is to provide a centrifugal separating machine having a centrifugal separating basket provided with a scraping means and with which latter is operatively associated means for operating the same including operating means and a slidable bar and a screw operatively connected to the bar for effecting a positive locking of the scraping means against acceleration or deceleration during advance of the scraping means into the wall of solids on the walls of the basket and while operating on the wall of solids preventing forward jump of the scraping means as well as preventing backlash thereof incident to impact of the scraping means with the wall of solids.

Another object of the invention is to provide a centrifugal separating machine embodying a housing or a casing for the rotary centrifugal basket and parts associated therewith and in which the casing is composed preferably of detachable sections whereby to readily permit access to the interior of the casing for repair or other purposes including removal of certain parts as units to facilitate servicing of the machine when necessary.

Another object of the invention is to provide a centrifugal separating machine of comparatively simple and inexpensive structure, and in which the purged material is discharged from the bottom of the basket, and in which the separated liquid is discharged from the top of the basket practically from the beginning of the time the solids are deposited on the inner peripheral wall of the basket, rather than after the building up of a substantial wall of solids, and thereby effecting seepage not only from within the basket but from within the wall of solids through the top of the basket as the latter revolves during the separation process.

Centrifugals are sometimes mounted on yieldable bearings which permit the basket to assume a center of rotation in accordance to its unbalanced load while in operation. In some centrifugals, irrespective of the mounting of the basket, the entire machine is mounted on a spring suspension in order to permit the basket to seek a new center of rotation according to varying loads, endeavoring to overcome the vibration that may be set up to unbalanced load conditions. These structures are not effective for the purposes particularly sought by me, and it is therefore another object of my invention to construct a means for dewatering sludges including a centrifugal separating machine in which the basket rotates on bearings arranged in fixed positions with relation to a rigid frame work and the axis of the basket, thereby restraining the basket against wabbling or undue lateral play, causing the same to rotate on a true or fixed center irrespective of load conditions.

In the dewatering of sludges, if the basket is permitted to rotate eccentrically, it will tend to disturb the solids which have been compacted in the basket and defeat the very purpose for which the present invention is intended. Therefore, another object of the present invention resides in the provision of means for dewatering sludges in which a centrifugal separating machine is employed and in which the basket is mounted on a relatively short vertical shaft extending centrally through the basket and having its upper end terminating at the top of the basket and its lower end terminating below and near the bottom of the basket and mounted at both ends in suitable bearings, one bearing preferably above the basket bottom and the other bearing arranged preferably below the basket bottom close to the same and in a manner to restrain the shaft and basket against lateral play, maintaining the shaft in a substantially true vertical axis to balance the basket during rotation of the same, preventing wabbling of the basket and undue vibration of the same during rotation thereof and thereby preventing disturbance to the compacted solids in the basket built up in separation of the liquid from the solids.

Another object of the invention is to equip the centrifugal separating machine with means for automatically coupling the motors to the rotary basket and for automatically uncoupling the motors therefrom.

It is also an object of the invention to provide a centrifugal separating machine in which the centrifugal basket is rotated at a high purging speed and a low cleaning speed with means for introducing the material into the basket while the basket is being rotated at high speed.

A further object of the invention goes to the separation of liquids from solids in a rotary centrifugal basket provided with seepage means for the passage of separated liquids and which seepage means is arranged radially continuous from the side walls of the basket inwardly of the basket throughout a substantial radial dimension of the cake for continuously discharging liquid from the cake throughout the entire impacting of the cake against the side wall of the basket.

A further object of the invention is to provide a rotary centrifugal basket for centrifugal separating machines wherein the basket has an imperforate side wall against which a cake of solids is built up under the centrifugal force of rotation of the basket and also including spaced members extending inwardly continuously from the side wall of the basket between which the cake is built up, one of said members having radially continuous seepage means extending in a radial direction throughout a substantial radial dimension of the cake for the passage of liquid through the seepage means at all radial points within the area of the seepage means.

A further object of the invention resides in the provision of a centrifugal separating machine including a rotary centrifugal basket including a seepage means for the continuous discharge of liquids separated from the solids and in which a wall of solids is built up in the basket during the separation process in combination with means provided for removing the wall of solids from the side wall of the basket for discharge from the basket, means for operating the solids wall removal means and means operative to clean the solids wall removal means and the side walls of the basket.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Fig. 4 is a vertical sectional view partly in elevation of the lower portion of the centrifugal machine, the feeding unit and the basket unit being removed and illustrating in dot and dash lines the manner of removing the said units.

Fig. 5 is a plan view of the upper intermediate section of the casing of the machine illustrating the means for operating the scrapers, the branches of the feed pipe being in section.

Fig. 6 is a detail plan view illustrating the construction of the liquid discharging means.

Fig. 7 is an enlarged detail sectional view of the upper portion of the centrifugal basket illustrating the arrangement of the liquid discharging means for the discharge of liquid, the section being taken in a plane indicated by the line 7—7 of Fig. 6.

Fig. 8 is a detail sectional view on the line 8—8 of Fig. 6.

Fig. 10 is a similar view showing the scrapers in their extended cutting position.

Fig. 11 is a detail view illustrating another form of straining means for the seepage or strainer plate.

Fig. 12 is a detail sectional view of the same on the line 12—12 of Fig. 11.

Fig. 16 is a detail sectional view taken on the line 16—16 of Fig. 5.

Figure 1:
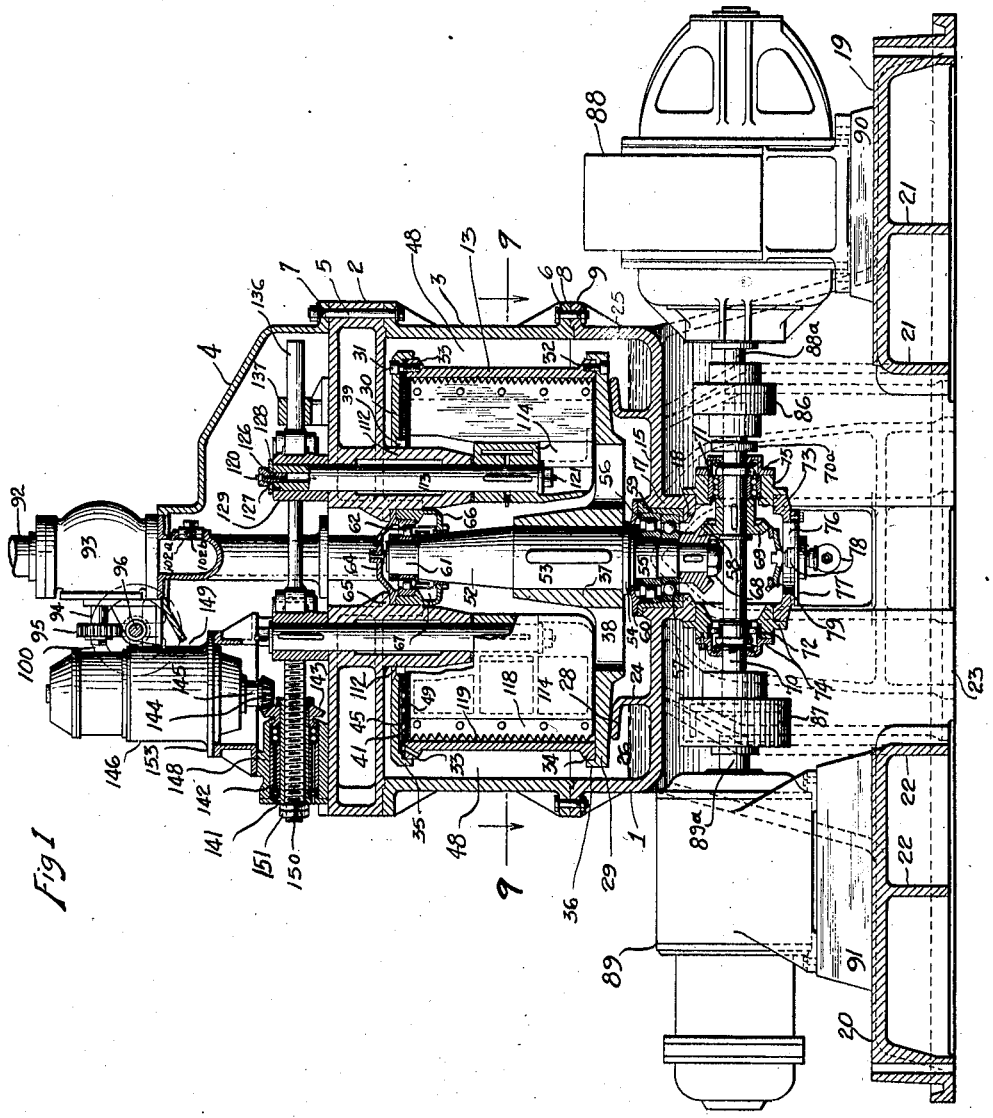
Figure 1 is a vertical sectional view partly in elevation of a centrifugal machine constructed in accordance with this invention.

In the accompanying drawings in which is illustrated the preferred embodiment of the invention, the centrifugal separating machine comprises in its construction a casing composed of a lower section 1, upper and lower intermediate sections 2 and 3 and a top section 4 secured together by upper and lower vertical bolts 5 and 6, the upper bolts being elongated and extending through the upper intermediate section 2 and adapted to be removed to permit the removal of the upper feeding unit and the basket unit as hereinafter fully described. The top, intermediate and bottom sections of the casing are provided with outwardly extending horizontal annular attaching flanges 7, 8 and 9 through which the said bolts 5 and 6 pass and the intermediate and bottom sections are preferably reinforced adjacent the flanges by webs, as clearly illustrated in Fig. 1 of the drawings.

Figure 3:
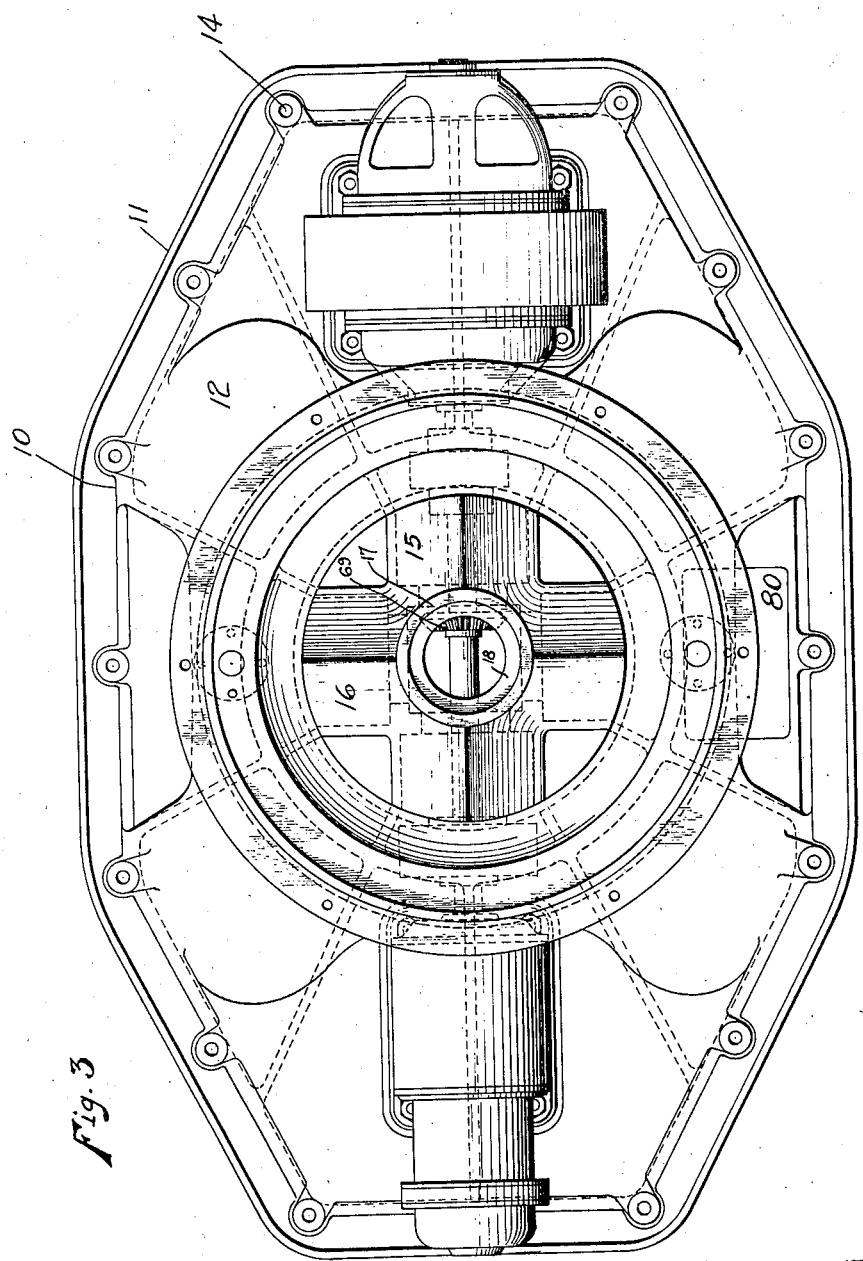
Fig. 3 is a plan view of the bottom section and base of the casing of the machine.

The bottom section 1 is provided with an integral base 10 preferably cast integral with the bottom section 1 and of substantially oblong form with tapered end portions 11, as shown particularly in Fig. 3. The base which may be varied in shape has inclined side portions forming walls 12 which support the bottom section 1 of the casing and the said base is designed to be arranged over a pit into which the sludge is discharged when it is unloaded from a centrifugal basket 13, as hereinafter fully explained. The base is provided at its periphery with openings 14 for the reception of bolts or other suitable fastening means for securing the base upon the walls of the pit or other foundation.

The base is reinforced by diametrically disposed integral longitudinal and transverse bracing members 15 and 16 constituting a spider located above and adapted to shield the gearing and the mechanism for operating the centrifugal basket to prevent the sludge discharged from the machine accumulating on the basket actuating means and interfering with or otherwise affecting the operation of the basket actuating mechanism. The members 15 and 16 have oppositely inclined side portions and present upper inclined faces and are adapted to shed sludge falling upon the said members. The spider is provided with a central integral bearing supporting ring 17 of cylindrical form provided at its lower end with an inwardly extending annular flange 18 which provides a supporting ledge for bearings hereinafter described.

The end portions of the base may be provided with integral platforms 19 and 20 presenting flat upper surfaces and preferably reinforced by integral cross pieces 21 and 22 as clearly illustrated in Fig. 1 of the drawings. The base is provided with a central opening 23 defined by the inner ends of the platforms 19 and 20 and the side walls of the base for the free discharge of sludge into the pit over which the base is mounted. The platforms 19 and 20 and the cross pieces 21 and 22 form hollow pedestals at the end portions of the base.

Figure 2:
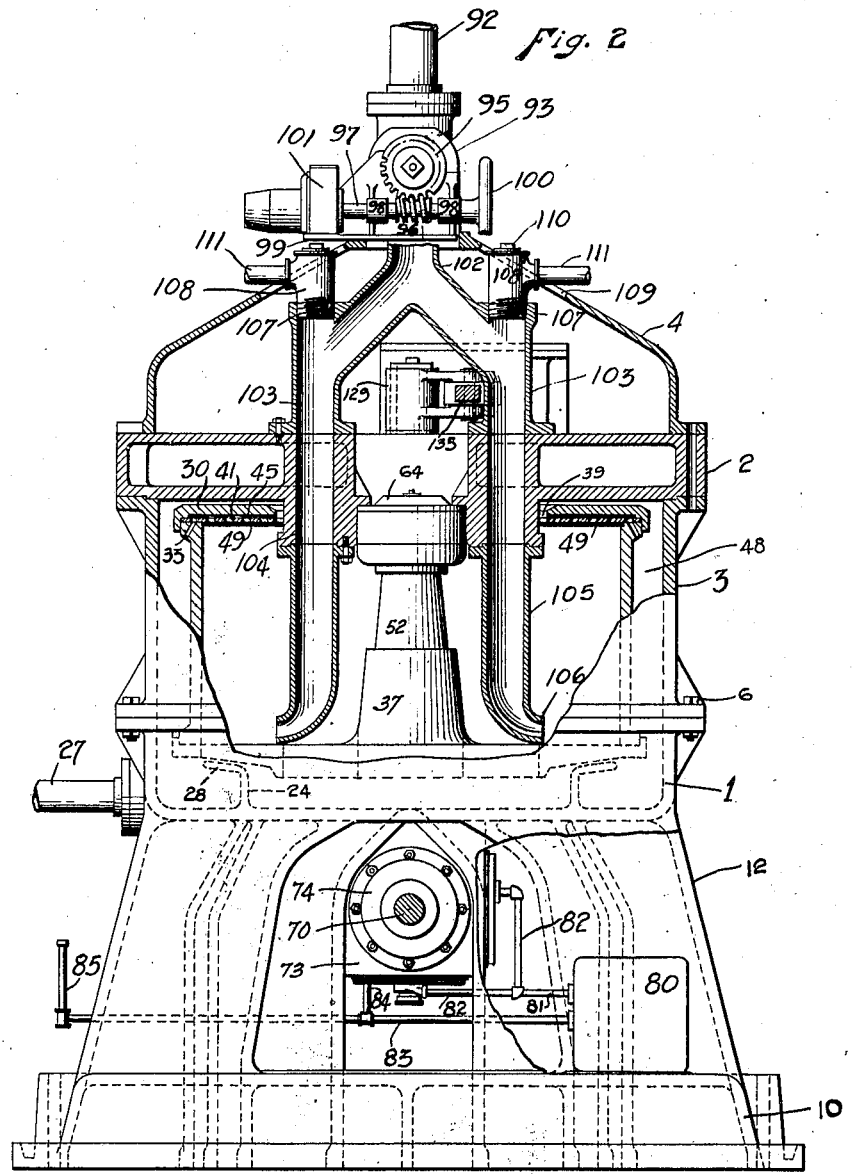
Fig. 2 is a similar view taken at right angles to Fig. 1.
Figure 17:
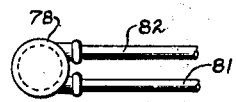
Fig. 17 is a detail view illustrating the arrangement of the oil feed and discharge pipes leading to and extending from the oil pump.
Figure 9:
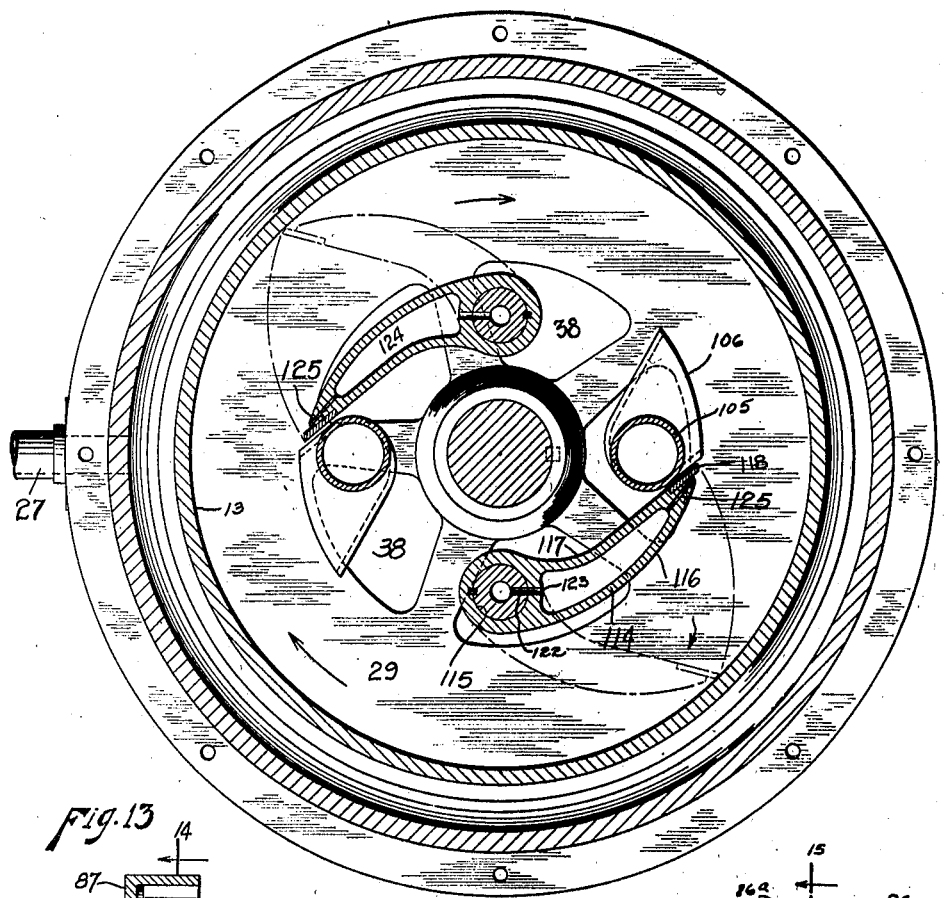
Fig. 9 is a horizontal sectional view taken substantially on the line 9—9 of Fig. 1 showing the scrapers in their folded position.

The bottom section 1 of the casing has inner and outer flanges 24 and 25 forming an interior annular trough 26 for the reception of effluent, as illustrated in Fig. 1, and the water or the liquid collecting in the annular trough 26 is carried off through an outlet pipe 27 of suitable capacity extending from the bottom section of the casing, as clearly illustrated in Figs. 2, 9 and 10 of the drawings. The inner flange 24 of the trough which is of less height than the outer flange 25 is provided with a slightly inclined top portion 28 extending outwardly and overhanging the inner portion of the trough 26 and adapted to prevent water or other liquid entering the annular trough from splashing over the inner wall and into the pit which receives the sludge. The flanges 24 and 25 are vertical and the outer flange 25 constitutes the bottom portion of the vertical wall of the casing.

The lower intermediate section 3 of the casing is cylindrical and the upper intermediate section 2 which constitutes a spacing and supporting member is preferably hollow as shown. The top section 4 which is tapered upwardly constitutes a cap and houses the mechanism supported upon the upper intermediate section 2 and is preferably constructed of lighter material than the other sections of the casing.

The centrifugal basket 13 consists of a cylindrical body portion, a circular bottom plate 29 and a circular top plate 30, the top and bottom plates being secured to the body portion of the basket 13 by upper and lower bolts 31 and 32.

The body portion of the basket 13 is reinforced at its upper and lower edges by exterior annular enlargements or ribs 33 and 34 and the top and bottom plates are provided with annular flanges 35 and 36 which embrace the ribs 33 and 34, as clearly illustrated in Fig. 1 of the drawings. The cylindrical body portion of the basket 13 forms imperforate vertical walls or sides and the bottom plate of the basket which has a horizontal upper face is provided with a central hub 37 and has a plurality of radial openings 38 surrounding the hub for the discharge of the sludge.

The top plate 30 of the centrifugal basket is of annular form and has a central opening 39 and it is provided at its lower face with a recess 40 which is divided into an annular series of radial channels 41 by radial enlargements 42 of a screen plate 43 which is interposed between the upper edge of the body portion of the centrifugal basket and the top plate 30. The recess which is divided into the channels 41 extends from the inner edge of the top plate to within a short distance of the flange 35 to provide an annular shoulder 44 which rests upon and provides for the clamping of the plate 30 between the upper edge of the body portion of the centrifugal basket and the top plate 30. The screen plate 43 is provided at the channels 41 with openings 45 arranged at an inclination and extending upwardly and outwardly to establish communication between the interior of the basket and said channels. The plate 30 is also provided at its outer portion beyond groups of inclined openings 45 with vertical openings 46 which register with inclined flared openings 47 formed in the upper enlargement or rib 33 of the body portion of the basket.

The water or other liquid removed from the material through the centrifugal action of the rotary basket flows upwardly and outwardly through the inclined openings 45 into the channels 41 and then radially to the outlet passages formed by the openings 46 and 47 which discharge the water radially and downwardly into an annular space 48 between the rotary basket and the casing of the machine. The water or other liquid flowing downwardly in the said space 48 enters the circular trough 26 and flows out through the outlet pipe 27 which conducts the liquid away from the machine.

In order to prevent the inclined openings 45 of the screen plate 43 from becoming clogged a screen 49 is arranged at the lower face of the screen plate and is provided at the groups of inclined openings with small perforations 50 which are preferably arranged in a group at each opening 45 and to effectually prevent fiber contained in the material from clogging the openings of the screen plate. The screen will prevent the fibers from clogging the holes in the screen plate when the same are too close to each other and prevent the interlocking of long fibers which might straddle any two holes in the screen plate. Instead of employing groups of small perforations in the screen, groups of slots 51 (Fig. 11) may be provided and if desired, groups of both perforations and slots may be used. The screen 49 while shown in the accompanying drawings as an annular plate provided with apertures, any other form of screen, such as a screen with crossed wires (not shown) may be employed and screen sections or strips may be used instead of a continuous annular screen and the screen may be secured in position by any suitable means.

Also as the top plate 30 and the screen plate 10 are readily removable, screen plates having openings of different sizes may be provided to enable the openings in the screen plate to be readily changed by substituting one screen plate for another to adapt the size of the openings to the character of material operated on by the machine.

The hub 37 of the bottom plate of the basket is mounted on a central vertical shaft 52 and is keyed or otherwise secured to a central cylindrical portion 53 of the same. The shaft 52 is provided at the lower end of the cylindrical portion 53 with an integral collar 54 which forms a shoulder upon which the bottom plate 29 of the basket rests. The lower portion 55 of the shaft 52 is provided with successive reductions and is mounted in bearings 56 and 57 and has a bevel gear 58 keyed or otherwise fixed to one of the reductions of the lower portion 55 of the shaft 52. The bearings 56 and 57 are mounted in a cylindrical bearing housing 59 which is supported within the bearing supporting ring 17 upon the shoulder formed by the flange 18 thereof, as clearly illustrated in Fig. 1 of the drawings. The bearing housing 59 is provided with a cap 60 which is in the form of a ring and through which the lower portion 55 of the central vertical shaft passes. The cap 60 fits the shaft beneath the collar 54 and seals the top of the bearing housing and prevents any of the sludge from entering the bearings. The lower bearing 57 is a ball thrust bearing and the upper bearing 56 is a radial roller bearing, the ball thrust bearing being arranged to also relieve the radial bearings of any strain imposed on the same.

The upper end 61 of the central vertical shaft 52 is reduced and is arranged in an upper radial roller bearing 62 mounted in a central opening 63 in the upper intermediate supporting section 2 of the casing of the machine. The radial roller bearing 62 is provided with a cap 64 which fits against a horizontal shoulder 65 formed by an annular flange located at the upper end of the opening 63. The upper radial roller bearing is introduced into the opening 63 at the bottom thereof and it is provided with a housing 66 extending below the roller bearing and forming an oil sump 67. The centrifugal basket is so mounted as to impart thrusts in the lowermost ball bearing and the two roller bearings take only the radial load. The upper radial bearing is located within the height of the basket thus making it possible to reduce the length of the central vertical shaft to a minimum.

The horizontal bevel gear which is detachably secured on the lower end of the vertical shaft by a nut 68 meshes with a vertical bevel gear 69 keyed or otherwise fixed to a horizontal motor actuated shaft 70 mounted in suitable bearings 71 and 72 supported in a gear case 73 at opposite sides thereof, as clearly illustrated in Fig. 1 of the drawings. The gear case 73 which is formed integral with and depends from the bearing supporting ring 17 is substantially rectangular in cross-section and in addition to enclosing the aforesaid gear mechanism it constitutes a shaft hanger, the sole means for supporting the said shaft 70, the shaft being supported intermediate its ends by said gear case. The gear case 73 is provided at opposite sides with circular openings to receive sectional housings 74 and 75 of the bearings 71 and 72. It will thus be seen that the bracing members 15 and 16 constitute a spider in which the lower bearing for the centrifugal basket is supported and this spider is formed in a peculiar manner to provide for an effective bracing of the base of the structure for the sake of rigidity and to provide a strong and substantial structure. As previously stated the bracing members 15 and 16 have sloping upper portions and by reference particularly to Figs. 1 and 3 it will be seen that the ends of the braces preferably flare outwardly in the direction of the respective walls of the base section of the casing and are connected thereto or formed therewith, the flared portions being widened with respect to the width of the side walls of the braces between the supporting bearing ring and the inner ends of said outer flared portions and widened to extend preferably to the lower portion of the base of the structure as illustrated in dotted lines particularly in Fig. 1. The outer ends of the bracing members 15 and 16 are formed as described not only for sake of rigidity of structure but also to provide for the reception and location on the base of the high and low speed motors as shown particularly in Fig. 3 and also to provide space for a suitable oil tank 80, hereinafter referred to, as shown particularly in Fig. 3. One of the essential features of the invention is to provide a compact structure and one possessing rigidity and by virtue of the braces formed and arranged as specified the structure is rendered rigid and provision made for a close coupling of the various elements of the machine and by reason of the construction and arrangement described ready access is had to the interior of the casing at the base portion thereof for repair or other purposes through openings in the side wall of the base.

The sectional housings close the openings in the opposite sides of the gear case and are bolted or otherwise secured to the same. The bearings 71 and 72 may be of any desired construction, the bearing 72 being illustrated as a roller bearing and the bearing 71 as a double ball bearing.

The gear case is provided at the bottom with an opening 76 which is normally closed by a bottom plate 77 bolted or otherwise secured to the gear case and supporting an oil pump 78 for supplying the gear case with a lubricant. The oil pump which may be of any desired construction is preferably of the rotary type and is provided at the top with a horizontal bevel gear 79 which meshes with the vertical bevel gear 69 at the bottom thereof whereby the pump will be continuously operated while the shaft 70 is rotated. The pump 78 is connected with a suitable oil tank 80 (Fig. 2) by a feed pipe 81 and it is connected with the gear case at the upper portion thereof by an outlet or discharge pipe 82 which in discharging oil into the gear case splashes oil on the gears contained within the same. The oil in the lower part of the gear casing through the turbulence of the gears, acts as a splash means for oiling the bearings. The gear case is connected at the bottom with the tank 80 by a return pipe 83 having a branch 84 connected with and extending downwardly from the bottom of the gear case. The return pipe which is extended to a point exteriorly of the machine is provided with an oil gauge 85 for indicating the level of the oil within the gear case.

The horizontal shaft 70 which extends beyond the gear case at opposite sides thereof is connected by suitable over-running clutches 86 and 87 to a high speed electric motor 88 and a low speed electric motor 89 having pedestals 90 and 91, respectively, mounted upon the platforms 19 and 20 of the base of the frame of the machine.

Figure 13:
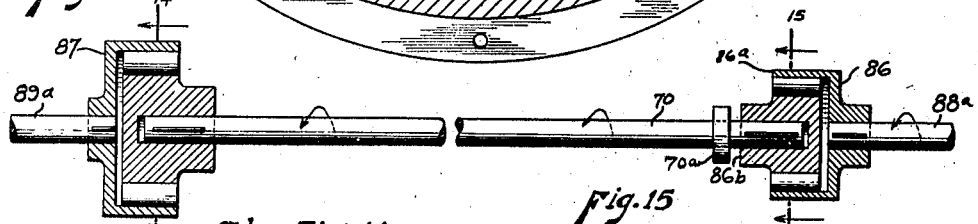
Fig. 13 is a detail view partly in section, illustrating the arrangement of the overrunning clutches of the lower horizontal motor actuated shaft.
Figure 14:
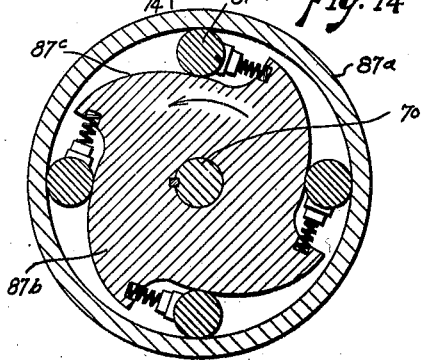
Fig. 14 is a vertical sectional view of one of the clutches taken on the line 14—14 of Fig. 13.
Figure 15:
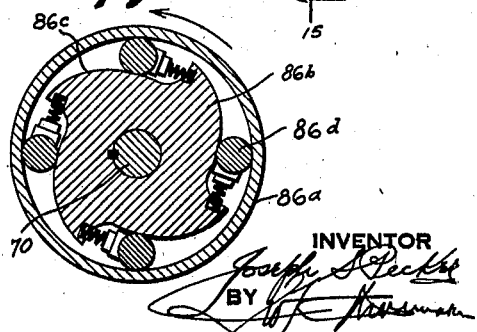
Fig. 15 is a similar view of the other clutch taken on the line 15—15 of Fig. 13.

Any suitable form of over-running clutch or coupling may be employed and in Figs. 13 to 15 inclusive is illustrated in detail one form of over-running clutch for automatically connecting the high speed motor and the low speed motor with the horizontal shaft 70. The over-running clutch 86 comprises an outer cylindrical member 86$^a$ keyed or otherwise secured to the high speed motor shaft 88$^a$ and an inner clutch member 86$^b$ keyed or otherwise secured to one end of the horizontal shaft 70. The inner clutch member 86$^b$ is provided with a plurality of peripheral cam or clutch faces 86$^c$ with which cooperate spring pressed rollers 86$^d$ interposed between the inner and outer clutch members. The over-running clutch 87 which connects the other end of the horizontal shaft 70 with the low speed motor shaft 89$^a$ is preferably of greater diameter than the over-running clutch 86 in order to enable the low speed motor to operate with greater leverage and power on the horizontal shaft 70 in the rotation thereof. The said clutch 87 as shown, is constructed the same as the clutch 86 and comprises in its construction an outer cylindrical clutch member 87$^a$, an inner clutch member 87$^b$, which are keyed or otherwise secured respectively to the low speed motor shaft 89$^a$ and the adjacent end of the horizontal shaft 70. The inner clutch member 87$^b$ is provided at its periphery with a plurality of clutch or cam faces 87$^c$ disposed at an angle to the cylindrical cooperating portion of the outer clutch member. Spring pressed rollers 87$^d$ are interposed between the inner and outer clutch members. When the outer clutch member 87$^a$ of the over-running clutch 87 is rotated in the direction of the arrow at a greater speed than the shaft 70 or when the shaft 70 is stationary, the over-running clutch will automatically couple the horizontal shaft to the low speed motor shaft and will be actuated by the low speed motor.

The rotation of the inner clutch member 86$^b$ of the over-running clutch 86 at a greater speed than the outer clutch member 86$^a$ or when the high speed motor shaft is stationary will prevent the rollers 86$^d$ from functioning to connect the inner and outer clutch members of the over-running clutch 86 and the horizontal shaft 70 may be rotated by the low speed motor without affecting the operation of the high speed motor.

The coupling of the horizontal shaft 70 with the high speed motor and the low speed motor by over-running clutches will enable the high and low speed motors to be connected with the horizontal shaft at all times and the clutches will automatically operate to couple the horizontal shaft to the shafts of the high and low speed motors.

This will enable either of the motors to connect itself automatically with the centrifugal rotary basket during the cycle of operation of the machine without any shock or jar to the mechanism. The high speed electric motor 88 rotates the centrifugal basket at high speed for purging the material operated on by the centrifugal basket and the low speed electric motor 89 rotates the centrifugal basket at a slow speed to permit removal of the sludge from the centrifugal basket.

The sewage or other material to be dewatered is fed to the centrifugal machine through a feed pipe 92 and the flow of the material into the machine is controlled by a standard valve 93 supported upon the top or cap section of the casing of the machine and having a rotary valve stem or shaft 94 to which is keyed or otherwise secured a worm wheel 95 which meshes with a worm 96 of a shaft 97 journaled in suitable bearings 98 of a supporting bracket 99 and provided at one end with a hand wheel 100 for manually operating the valve 93.

The valve in the continuous operation of the automatic centrifugal machine is periodically operated by a standard electrical control unit 101 for feeding sewage or other material during a portion of the cycle of the operation of the machine and for shutting off the flow of material during another portion of the cycle of the machine. When the shaft 97 is rotated manually or by the standard electrical control unit 101 the worm will rotate the worm wheel 95 and open or close the valve according to the direction of the rotation of the shaft 97.

The feed pipe 92 is provided below the valve 93 with a Y-branch 102 which divides the feed pipe into twin feed portions extending to opposite sides of the machine. The said feed pipe 92 is provided below the valve with a clean out opening 102ª which is normally closed by a screw plug 102ᵇ. The Y-branch 102 is provided with lower vertical portions 103 which are flanged at their lower ends and bolted or otherwise secured to the upper intermediate section 2 of the casing of the machine. The intermediate or supporting member 2 of the casing is provided with integral tubular feed pipe sections 104 to which are bolted or otherwise secured lower nozzle sections 105 having lower laterally deflected flattened discharge nozzles 106 forming outlets for the sludge and extending slightly beyond the outer ends of the radial openings 38 of the bottom plate of the centrifugal basket for discharging the material upon the annular imperforate portion of the bottom plate lying beyond the radial openings 38, as clearly illustrated in Figs. 9 and 10 of the drawings.

The upper ends of the lower sections 105 of the twin feed pipes are flanged and suitably secured to flanged portions of the lower ends of the intermediate sections 104 of the said twin feed pipes. The twin feed branches or pipes have the same cross sectional area throughout their entire length and the material is divided by the twin feed pipes and is discharged into the centrifugal basket at substantially diametrically opposite points and is adapted to be fed more uniformly and with greater rapidity and with less danger of any of the material leaving the bottom plate and falling through the radial openings 38 than would be the case were a single feed pipe employed for discharging the material into the basket at a single point. Where the mouths of the twin branches of the feed pipes are flattened they are simultaneously widened (see Figs. 9 and 10) so as to preserve the said uniform cross sectional area of the branch feed pipes throughout their entire length. The material discharged into the centrifugal basket by the twin branches of the feed pipe is carried outwardly through the centrifugal action of the rotary basket and collects in the angle formed by the bottom plate 29 and the cylindrical body portion of the centrifugal basket and the dewatered sludge collects on the imperforate vertical wall formed by the body portion of the centrifugal basket while the water or other liquid purged from the material is carried upwardly through the centrifugal action of the rotary basket and is caused to flow through the radial channels of the top plate to the discharge passages formed by the peripheral openings 46 and 47 at the outer ends of the radial channels.

Any surplus material entering the machine will overflow at the top of the centrifugal basket passing around the inner edge of the top plate and over the top plate into the space between the centrifugal basket and the lower intermediate section of the casing of the machine. The feeding of the material into the centrifugal basket continues for a predetermined period until the sludge builds up and collects on the imperforate vertical wall of the basket to the desired extent, after which the valve is operated to shut off the flow of material to the basket.

The side branches of the feed pipe are provided at the top with clean out openings 107 which are threaded for the reception of fittings 108 disposed vertically in alignment with the passages of the twin branches of the feed pipe at openings 109 in the top section 4 of the casing of the machine and provided at their upper ends with removable caps 110 and having laterally extending branch pipes 111 adapted to be connected with suitable means for injecting steam, air under pressure, or chemicals into the branches of the feed pipe for mechanical agitation or chemical treatment of the material operated on by the machine. The lateral branch pipes 111 of the clean out fittings 108 extend outwardly through the openings 109 in the top section 4 of the casing of the machine and may be connected with any suitable means for supplying the steam, compressed air or chemicals for treating the material. The intermediate supporting member 2 of the casing of the machine is provided at opposite sides of the center with vertical hubs 112 depending from the supporting member 2 and extending into the upper portion of the centrifugal basket and having mounted within them vertical shafts 113.

The vertical shafts 113 which are hollow extend through the hubs and project above and below the same, as clearly illustrated in Fig. 1 of the drawings.

Mounted upon the lower end portions of the vertical shafts 113 are curved scrapers 114 tapered outwardly from the shafts and provided at their inner ends with openings 115 to receive the shafts and keyed or otherwise secured to the same. The scrapers which are hollow and arranged vertically are curved from the shafts 113 to their outer vertical edge and tapered outwardly and they present convex exterior faces 116 at their outer sides and concave exterior faces 117 at their inner sides, the curvature of the scrapers from their shafts to their outer vertical edges permitting the scrapers to fold substantially concentrically at the center of the machine within the inner periphery of the imperforate annular portion of the bottom plate of the centrifugal basket so as to be out of the way of the material carried by the basket, as clearly illustrated in Fig. 9 of the drawings. This permits the centrifugal basket to be rotated at high speed for purging the material without the scrapers retarding or in any wise interfering with the rotation of the centrifugal basket at high speed. Also the folding of the scrapers into this small diameter facilitates the maximum filling of the centrifugal basket. Furthermore, the compact folding of the curved scrapers centrally of the machine facilitates the disassembly of the upper unit of the machine including the scraper arms and the inlet pipes and the entire upper unit of the machine may be removed without removing or otherwise disturbing any of the other parts of the machine.

The centrifugal basket rotates in the direction of the arrows in Figs. 9 and 10 of the drawings and when the scrapers 114 swing outwardly from the closed position illustrated in Fig. 9 of the drawings to their open position shown in Fig. 10 of the drawings, they move in the direction of the rotation of the centrifugal basket, as indicated by the dot and dash lines in Fig. 9 of the drawings. The rotation of the centrifugal basket is thereby utilized in the assisting of the cutting action of the scrapers and the progressive outward movement of the scrapers in cutting or scraping the dewatered material out of the basket. The scrapers are provided at their outer edges with vertical blades 118 bolted or otherwise detachably secured to the scrapers and projecting at the outer edges thereof for engaging and cutting or scraping material from the basket during the slow rotation of the same by the low speed electric motor 89. The projecting engaging edge of each of the blades 118 is preferably provided with tapered teeth 119 but cutting edges of any preferred form may, of course, be employed. The sludge cut and scraped from the centrifugal basket is fed inwardly as clearly illustrated in Fig. 10 of the drawings, and is discharged from the basket through the radial openings 38 in the bottom plate thereof.

The hollow shafts are closed at their upper and lower ends by threaded plugs 120 and 121 and at an intermediate point the hollow shafts are provided with radial openings 122 forming passages which communicate with passages 123 of the scrapers.

The passages 123 of the scrapers communicate with the interior chambers 124 formed by the hollow character of the scrapers and the latter are provided at their outer edges with a plurality of jet openings 125 located back of the blades 118 at the projecting portions thereof for the purpose of cleaning the cutters and at the same time cleaning the interior surface of the basket when the major portion of the sludge has been cut out of the latter. The screw plugs 120 and 121 preferably consist of screws engaging threaded portions of bores 126 of nipples 127 fitted in the bores or passages of the hollow shafts and provided with annular flanges 128 fitted against the ends of the shafts 113 and secured to the same by suitable fastening devices. The screws 120 are adapted to be removed to enable a pipe connection to be readily attached to the nipple for injecting air into the hollow shafts. The compressed air may be supplied from a pump, tank or any other suitable source.

Secured to the upper ends of the hollow shafts 113 are operating arms 129 extending horizontally from the shafts 113 and provided at their inner ends with openings 130 receiving the shafts to which the operating arms 129 are keyed or otherwise secured. The operating arms are provided at their outer portions with pins 131 which extend downwardly from the lower faces of the operating arms into bearing openings 132 of blocks 133 which are slidably mounted in transverse openings 134 of a longitudinally slidable connecting bar 135. The arms 129 are preferably of bifurcated form to provide upper and lower portions, as clearly illustrated in Fig. 2 of the drawings.

The slidable connecting bar 135 is arranged transversely of and is located above the supporting member 2 of the casing of the machine and is spaced from the center thereof, as clearly illustrated in Fig. 5 of the drawings. One end portion 136 of the connecting bar is rounded and is arranged in a guide 137 consisting of a sleeve formed integral with an attaching plate 138 constituting the base of the guide and bolted or otherwise secured to the upper face of the supporting member 2 of the casing. The connecting bar 135 which is connected at its other end with a screw 139 is provided at spaced points with enlargements 140 projecting laterally from opposite sides of the connecting bar 135 and having the block receiving openings 134 formed therein. The screw is engaged by an interiorly threaded horizontally disposed sleeve 141 mounted in a suitable bearing 142 (Fig. 1) and provided at its inner end with a vertically disposed bevel gear 143 keyed or otherwise fixed to the interiorly threaded sleeve 141 and meshing with a horizontal bevel gear 144 of the shaft 145 of a vertically disposed 1 H. P. electric cleaner motor 146 adapted to be operated for swinging the scrapers outwardly and inwardly. When the motor is operated, rotary motion is communicated to the interiorly threaded sleeve and the screw 139 is moved longitudinally either inwardly or outwardly according to the direction of the rotation of the sleeve to slide the connecting bar 135 and thereby swing the arms 129 and partially rotate the vertical shafts upon which the scrapers are mounted. The sliding movement of the blocks 133 in the transverse openings 134 permits the arcuate movement of the pivot pins 131 which connect the arms with the slidable connecting bar 135.

The end 147 of the slidable connecting bar 135 is preferably provided with a socket to receive the adjacent end of the screw which is preferably reduced and threaded into the said socket 147, but the inner end of the screw may be secured to the slidable bar or otherwise connected therewith in any suitable manner. The bearing 142 which may be provided at its inner end with balls and at its outer end with rollers, as illustrated in Fig. 1 of the drawings, is mounted in a bracket 148 which is secured to the supporting member 2 of the casing of the machine and which forms a support for the vertical motor 146. The motor 146 which actuates the mechanism for operating the scrapers may be mounted in any other desired manner, as will be readily understood, and when the motor 146 is arranged vertically the top section for the casing is provided with an opening 149 through which the motor extends.

The outer end 150 of the screw 139 is reduced and threaded for the reception of adjustable jam nuts 151 which are adapted to engage the outer end of the interiorly threaded gear actuated sleeve for limiting the inward movement of the scrapers. The adjustable jam nuts will enable the actuating mechanism of the scrapers to be adjusted so as to permit the blades of the scrapers to approach the imperforate vertical walls of the centrifugal rotary basket as near as desired without liability of the cutting teeth or edges of the blades of the scrapers coming in contact with the centrifugal basket.

By adjusting the jam nuts the scrapers may be adjusted so that when at the limit of their outward movement they will operate to scrape the inner faces of the vertical walls of the centrifugal basket and remove all accumulation therefrom without the blades coming in contact with the side walls of the basket.

The bracket 148 which may be fixed to the supporting member 2 of the casing in any desired manner, may be of any preferred construction, and it is provided at the top with a curved seat 152 arranged concentric with the motor which is provided near its lower end with an attaching flange 153 bolted or otherwise detachably secured to the seat. The lower end of the vertical motor 146 extends below the seat and is arranged within the supporting bracket, as clearly illustrated in Fig. 1 of the drawings.

By removing the vertical bolts 5 the entire upper unit comprising the supporting member 2, the top cap 4 and the mechanism mounted on the supporting member including the means for feeding the material to the centrifugal basket and the means for cleaning or unloading the basket, may be removed as a unit from the machine. For this purpose suitable eye bolts 154 are provided and are located at opposite sides of the supporting member of the machine, as illustrated in dot and dash lines in Fig. 4 of the drawings. The eye bolts 154 which engage suitable threaded openings 155 in the supporting member are adapted to receive hoisting mechanism for lifting the upper unit out of the machine, as illustrated in dot and dash lines in Fig. 4 of the drawings.

Should it be necessary to remove the basket unit from the machine for servicing purposes an eye bolt 156 may be inserted in a threaded opening 157 in the upper end of the vertical shaft 52 of the basket and its shaft and the basket may be lifted out of the machine as a unit, as illustrated in dot and dash lines in Fig. 4 of the drawings. In fact, the basket and its supporting shaft and enclosed bearings and the gear 58 of the basket driving gear mechanism may all be removed or replaced as one assembly or unit without disturbing location or alinement of the assembled parts comprising said assembly or unit.

Instead of employing an over-running clutch for connecting the high speed motor with the horizontal shaft 70 the coupling adjacent the high speed motor may be a standard coupling normally used to connect a motor and a driven shaft.

When a free wheeling clutch is employed a brake 70ª of any suitable construction will be arranged either on the horizontal motor driven shaft, or on the vertical basket carrying shaft so that the speed of the rotary basket may be reduced at will, but when the reversal of the current is employed for plugging the motor to slow up the speed of the rotary basket the standard flexible coupling will be used for connecting the high speed motor with the horizontal motor driven shaft. As the construction of the standard couplings and also the construction of the brake for controlling the speed of the centrifugal basket are well known in the art detail description and illustration thereof are believed to be unnecessary.

The entire machine is designed to be controlled by an electric switch board so that the complete cycle of operation will be automatic and continuous, as disclosed in one way, in my co-pending application filed December 26, 1934, Serial No. 759,302.

What is claimed is:

1. A centrifugal separating machine for dewatering solids including a vertically disposed rotary centrifugal basket having imperforate side walls against which a wall of solids is gradually built up incident to centrifugal force due to rotation of the basket, the basket being provided in its bottom with an opening for the discharge of dewatered solids and at its top provided with a top structure provided with open ended channels, each channel having a series of spaced openings arranged relatively close together and extending from the side wall of the basket to the inner end of the respective channel to establish communication between the channels and the interior of the basket to permit continuous discharge of seepage through the channels from within the wall of solids impacted against the basket wall and from within the interior of the built-up wall of solids throughout the entire impacting operation, means for rotating the basket, and means for gradually removing the dewatered solids from the basket through the bottom opening of the latter.

2. In a centrifugal separating machine including a rotary centrifugal basket mounted on a vertical axis and having an imperforate peripheral side wall against which a cake of solids is built up under the centrifugal force of rotation, an annular member constituting the bottom of the basket and providing for the discharge of solids through the same, a member carried by the basket and spaced substantially from said annular member and extending inwardly from said wall throughout the periphery thereof and having seepage means arranged radially continuous from the peripheral wall of the basket inwardly of the basket throughout a substantial radial dimension of the cake for continuously discharging liquid from the cake throughout the entire impacting operation, means for cutting the cake from the side wall of the basket into particles for discharge through said annular member during rotation of the basket, and means for rotating the basket.

3. A centrifugal separating machine for dewatering materials including a rotary centrifugal basket having imperforate side walls and provided with means for the seepage of liquids, a vertical shaft having the basket mounted on it and extending through the same interiorly thereof and terminating at its upper end at the top of the basket, bearings in which the end portions of said shaft are removably mounted, and means for rotating the basket at a high purging speed and a low cleaning speed including a gear on the lower portion of the said shaft through which the basket assembly is rotated, the complete basket assembly, including the basket, said shaft and said gear, being removable as a unit from the machine.

4. A centrifugal separating machine for dewatering materials including a rotary centrifugal basket, a vertical shaft on which the basket is mounted extending through the basket interiorly thereof from the bottom to the top of the same and terminating at the top of the basket, the latter being provided in its bottom adjacent the lower end of the shaft with an opening for the discharge of dewatered solids, a horizontal shaft located below the rotary basket, gearing connecting the shafts, and means operating through the said horizontal shaft and gearing for rotating the centrifugal basket at a high purging speed and low cleaning speed, the basket, shaft, and a part of the said gearing being removable as an integral unit from the machine.

5. A centrifugal separating machine for dewatering materials including a rotary centrifugal basket, a vertical shaft on which the basket is mounted extending through the basket interiorly thereof from the bottom to the top of the same and terminating at the top of the basket, the latter being provided in its bottom adjacent the lower end of the shaft with an opening for the discharge of dewatered solids, a horizontal shaft located below the rotary basket, gearing connecting the shafts, means operating through the said horizontal shaft and gearing for rotating the centrifugal basket at a high purging speed and a low cleaning speed, including high and low speed motors, and automatic means including a free wheeling device associated with the low speed motor whereby the low speed motor will be disconnected from the basket while the high speed motor is operating and the low speed motor will be enabled to pick up the speed of the basket when the high speed motor has ceased its operation.

6. A centrifugal separating machine for dewatering materials including a rotary centrifugal basket, a vertical shaft carrying the centrifugal basket and extending through the basket interiorly thereof from the bottom to the top of the same and terminating at the top of the basket, the latter being provided in its bottom adjacent the lower end of the shaft with an opening for the discharge of dewatered solids, a horizontal shaft located below the vertical shaft, a pair of bevel gears connecting the vertical and horizontal shafts and means for rotating the basket at a high purging speed and a low cleaning speed including a high speed motor located at one end of the horizontal shaft and a low speed motor located at the other end of the horizontal shaft, and means including free wheeling devices associated with the high speed and low speed motors for automatically coupling the motors with the horizontal shaft.

7. A centrifugal separating machine for dewatering materials including a rotary centrifugal basket, a vertical shaft carrying the centrifugal basket and extending through the basket interiorly thereof from the bottom to the top of the same and terminating at the top of the basket, the latter being provided in its bottom adjacent the lower end of the shaft with an opening for the discharge of dewatered solids, a horizontal shaft located below the rotary basket, gearing connecting the horizontal and vertical shafts, means for rotating the basket at a high purging and a low cleaning speed comprising high and low speed motors located at the ends of the horizontal shaft, and means for connecting the motors with the horizontal shaft, the connection to the low speed motor including an over-running clutch whereby the low speed motor will be disconnected from the basket while the high speed motor is operating and will be enabled to pick up the speed of the basket when the high speed motor has ceased its operation.

8. A centrifugal separating machine for dewatering materials including a rotary centrifugal basket, a vertical shaft carrying the basket and extending through the same substantially centrally thereof, the basket being provided in its bottom adjacent the lower end of the shaft with an opening for the discharge of dewatered solids, means for rotating the basket, means for feeding the material to be dewatered to the basket including a feed pipe having a Y-shaped branch including substantially vertically disposed leg portions extending into the basket and straddling said vertical shaft and having the lower ends of the leg portions deflected radially of the basket and contracted vertically and distended laterally to feed the material into the basket between the basket discharge opening and the side walls of the basket.

9. A centrifugal separating machine including a casing, a rotary centrifugal basket located within the casing, a vertical shaft carrying the basket and extending through the same interiorly thereof from the top to the bottom of the basket, the latter being provided in its bottom adjacent the lower end of the shaft with an opening for the discharge of dewatered solids, means connected with the lower end of the vertical shaft for rotating the basket, a vertical feed pipe extending into the casing at the top thereof and provided within the casing with an inverted substantially Y-shaped branch having upper downwardly diverging sloping portions communicating with side portions straddling the vertical shaft and extending downwardly into the basket for delivering the material to the basket at opposite sides thereof beyond the discharge opening in the bottom of the basket, said casing being provided with openings coinciding with the sides of the Y-shaped branch and affording access to the same.

10. A centrifugal separating machine including a casing having a removable upper portion, a rotary centrifugal basket mounted within the casing and provided in the bottom with an opening for the discharge of dewatered solids, means for rotating the basket, means mounted on the removable section of the casing for feeding the material to be dewatered to the basket beyond the bottom discharge opening, and means also carried by the removable section of the casing for cleaning the basket of the dewatered solids and discharging the same through the opening in the bottom of the basket, said feeding means and cleaning means being removable as a unit with the removable section of the casing.

11. A centrifugal separating machine including a casing having a removable upper portion, a rotary centrifugal basket located within the casing, an annular top plate on the basket provided with a central opening, a vertical shaft carrying the basket and extending through the same interiorly thereof from the bottom to the top of the basket, the latter being provided in its bottom with an opening for the discharge of dewatered solids, means connected with the vertical shaft for rotating the basket, a feed pipe having a lower substantially Y-shaped branch mounted on the removable section of the casing, the side portions of the Y-shaped branch straddling the shaft and extending into the basket for delivering the material to the basket at opposite sides thereof beyond the opening in the bottom of the basket, and a pair of swinging cutters carried by the removable upper portion of the casing and arranged within the basket at opposite sides of the said Y-shaped branch of the feed pipe for cleaning the dewatered sludge from the basket, said feed pipe and cutters being removable from the machine as a unit through said central opening in said basket top plate upon the removal of the upper portion of the casing.

12. A centrifugal separating machine for dewatering materials including a rotary centrifugal basket, a vertical shaft carrying the basket and extending through the same interiorly thereof from the bottom to the top of the basket, the latter being provided in its bottom with an opening for the discharge of dewatered solids, means connected with the vertical shaft for rotating the basket, a feed pipe provided with a valve and having a substantially Y-shaped branch forming side portions straddling the vertical shaft and extending into the basket for delivering the material to the basket at opposite sides thereof beyond the opening in the bottom of the basket, two swinging cutters operating within the basket and located at opposite sides of the Y-shaped branch of the feed pipe, a removable support carrying the feed pipe and swinging cutters, valve operating means mounted on the removable support, and mechanism also carried by the removable support for actuating the swinging cutters to move the same outwardly and inwardly, the feed pipe, valve operating means, swinging cutters and mechanism for actuating the same being removable from the machine as a unified assembly.

13. In a centrifugal separating machine a casing, a centrifugal rotary basket arranged within the casing, spaced vertical shafts mounted within the casing and depending into the centrifugal basket, horizontally swinging scrapers carried by the depending portions of the shafts, lever arms connected with the shafts, a slidable connecting bar connected with the lever arms, a motor located above the basket, and means actuated by the motor for sliding the connecting bar for simultaneously operating the scrapers.

14. In a centrifugal separating machine, a base having a central bearing ring and provided with bracing members extending to and supporting the bearing ring and forming radial openings for the passage of dewatered solids and having sloping upper surfaces adapted to shed sludge, a rotary centrifugal basket journalled in the bearing ring and provided in its bottom with an opening for the discharge of dewatered solids, and means for rotating the basket including a power shaft located beneath the bracing members and supported solely from the same and confined to within the area of the base and shielded by the bracing members from the sludge.

15. In a centrifugal separating machine, a base provided with a central bearing ring and having cross bracing members extending to and supporting the bearing ring and forming radial openings for the passage of dewatered solids and provided with sloping upper surfaces for shedding sludge, a rotary centrifugal basket having a vertical shaft journalled in the bearing ring said basket being provided in its bottom with an opening for the discharge of dewatered solids, a gear case supported by and suspended from the cross bracing members beneath the bearing ring, a horizontal shaft extending through the gear case on both sides of the bearing ring and gear case and located beneath and shielded from sludge by the cross bracing members, and gearing located within the gear case and connecting the horizontal and vertical shafts.

16. In a centrifugal separating machine including a rotary centrifugal basket having an imperforate peripheral wall against which a cake of solids is built up under the centrifugal force of rotation, spaced members extending inwardly from said wall throughout the periphery thereof, one of said members having seepage means arranged radially continuous from the peripheral wall of the basket inwardly of the basket throughout a substantial radial dimension of the cake for continuously discharging liquid from the cake throughout the entire impacting operation.

17. In a centrifugal separating machine, a casing comprising a bottom section having a base and provided with a central bearing opening, an intermediate section mounted upon the bottom section, a supporting member spaced from the bottom section by the intermediate section, and a top section mounted upon the supporting member, a rotary centrifugal basket arranged within the casing below the supporting member and having a vertical shaft journalled in said bearing opening, means mounted on the base and connected with the lower end of the vertical shaft for rotating the basket at a high purging speed and a low cleaning speed, cleaning means mounted on the supporting member for removing the sludge from the basket, and an operating mechanism for the cleaning means mounted upon the supporting member and located within the top section of the casing.

18. In a centrifugal separating machine, a rotary centrifugal basket having a horizontal bottom, a central vertical shaft having the basket mounted upon it and extending upwardly from the bottom to the top of the basket interiorly thereof, and upper and lower radial bearings located at the top and bottom of the basket and receiving the ends of the shaft, one of the radial bearings being located within the basket above the basket bottom and the other bearing being located beneath the basket bottom close to the same.

19. In a centrifugal separating machine, a rotary centrifugal basket comprising a cylindrical body portion forming imperforate side walls and provided at the top with downwardly and outwardly inclined outlets, a top plate secured to the cylindrical body portion and provided with channels extending inwardly from the said outlets, and a screen plate arranged at the lower face of the top plate and provided at the channels with openings communicating with the channels and the interior of the basket to permit seepage of liquid from the basket during the entire purging operation.

20. In a centrifugal separating machine, a rotary centrifugal basket comprising a cylindrical body portion forming imperforate side walls and provided at the top with downwardly and outwardly inclined outlets, a top plate secured to the cylindrical body portion and provided with channels extending inwardly from the said outlets, a screen plate arranged at the lower face of the top plate and provided at the channels with openings communicating with the channels and the interior of the basket to permit seepage of liquid from the basket during the entire purging operation, and a screen arranged at the lower face of the screen plate and provided at the openings thereof with groups of relatively small apertures arranged to exclude fiber and other solid material from the openings of the screen plate.

21. In a centrifugal separating machine, a rotary centrifugal basket, two horizontally swinging scrapers located within the basket diametrically opposite each other and provided with vertical pivot shafts, lever arms extending from the said shafts, a connecting bar pivotally connected with the lever arms, a motor and means actuated by the motor including a screw connected with said connecting bar and movable with the same for simultaneously swinging the scrapers inwardly and outwardly.

22. In a centrifugal separating machine, a rotary centrifugal basket, two horizontally swinging curved scrapers having cutting portions for removing the sludge from the basket, said scrapers being pivotally mounted diametrically opposite each other and arranged to fold substantially concentrically at the center of the basket, means for simultaneously swinging the scrapers outwardly and inwardly to carry the scrapers into the path of dewatered sludge for cutting the same from the basket while the latter is rotating, said means including lever arms connected with the swinging scrapers and provided with pivots, a slidable connecting bar having transverse guides receiving the pivots of the lever arms, a motor and means actuated by the motor including a screw connected to said bar and a rotatable threaded sleeve on said screw for moving the same and the bar back and forth.

23. In a centrifugal separating machine, a rotary centrifugal backet, two horizontally swinging curved scrapers having cutting portions for removing the sludge from the basket, said scrapers being pivotally mounted diametrically opposite each other and arranged to fold substantially concentrically at the center of the basket, means for simultaneously swinging the scrapers outwardly and inwardly to carry the scrapers into the path of dewatered sludge for cutting the same from the basket while the latter is rotating, the pivots of the scrapers maintaining a relatively fixed position with relation to the material to be cut and the scrapers being movable in the direction of the rotation of the basket during the outward movement, said means including lever arms connected with the scrapers, a connecting bar pivotally connected with the lever arms and provided at one end with a screw, a guide slidably receiving and supporting the other end of the connecting bar, a motor and gearing actuated by the motor and having a gear element provided with threads for engaging said screw for sliding the connecting bar to move the scrapers outwardly and inwardly.

24. In a centrifugal separating machine having openings at the bottom for the discharge of sludge, pivotally mounted horizontally swinging curved scrapers presenting concave faces to the material cut from the basket and arranged to converge the said material towards the center of the basket for discharging the cut sludge at the bottom of the basket, said scrapers having interior chambers for a cleaning fluid and provided with outlets for the discharge of the same, and means for introducing a cleaning fluid under pressure into said chambers.

25. In a centrifugal separating machine including a rotary centrifugal basket, a hollow vertical shaft extending into the basket to receive air under pressure, a hollow horizontally swinging scraper of substantially box form having an interior chamber, said scraper being mounted on the hollow shaft with its chamber communicating with the interior of the shaft, said scraper being provided at its outer edge with cutting means for removing sludge from the basket and having air slots adjacent the cutting means for passage of air for cleaning the cutting means and at the same time cleaning the inside surface of the basket when the major part of the sludge has been removed therefrom.

26. In a centrifugal separating machine, a casing having a supporting member at the top, a rotary centrifugal basket arranged within the casing, spaced vertical shafts mounted in the supporting member and depending therefrom into the basket, horizontal swinging scrapers carried by the depending portions of the shafts and movable toward and from the walls of the basket, lever arms connected with the shafts above the supporting member, a slidable connecting bar guided on the supporting member and connected with the lever arms for simultaneously operating the scrapers, a screw connected with and extending from one end of the connecting bar, a threaded sleeve receiving and engaging the screw, a motor located adjacent the supporting member, and means for connecting the motor with the sleeve for rotating the same to actuate the connecting bar and screw to operate the scrapers.

27. In a centrifugal separating machine, a casing having a supporting member at the top, a rotary centrifugal basket arranged within the casing, spaced vertical shafts mounted in the supporting member and depending therefrom into the basket, horizontal swinging scrapers carried by the depending portions of the shafts and movable toward and from the walls of the basket, lever arms connected with the shafts above the supporting member, a slidable connecting bar guided on the supporting member and connected with the lever arms for simultaneously operating the scrapers, a screw connected with and extending from one end of the connecting bar, a threaded sleeve receiving and engaging the screw, a motor carried by the supporting member, and gearing connecting the motor with the threaded sleeve.

28. In a centrifugal separating machine, a casing having a supporting member at the top, a rotary centrifugal basket arranged within the casing, spaced vertical shafts mounted in the supporting member and depending therefrom into the basket, horizontal swinging scrapers carried by the depending portions of the shafts and movable toward and from the walls of the basket, lever arms connected with the shafts above the supporting member, a slidable connecting bar guided on the supporting member and connected with the lever arms for simultaneously operating the scrapers, a screw connected with and extending from one end of the connecting bar, a threaded sleeve receiving and engaging the screw, a motor, means for connecting the motor with the sleeve for rotating the same to actuate the connecting bar and operate the scrapers, and an adjustable stop mounted on the screw for limiting the movement of the scraper arms.

29. A centrifugal separating machine for dewatering material including a rotary centrifugal basket, a vertical shaft carrying the basket and extending through the same interiorly thereof from the bottom to the top of the basket and terminating at the top of the basket, the latter being provided in its bottom adjacent the lower end of the shaft with an opening for the discharge of dewatered solids, a single horizontal power shaft rotatable in one direction only and operatively connected to said vertical shaft, high and low speed motors having operative connection with the power shaft for rotating the basket at a high purging speed and a low cleaning speed and means including free wheeling devices controlled by the speed of the motors for automatically connecting the same with the horizontal power shaft and for automatically disconnecting the motors from said shaft.

30. In a centrifugal separating machine, a rotary centrifugal basket including a cylindrical body forming imperforate side walls and a top plate secured to the cylindrical body and having substantially horizontal open-ended seepage channels extending outwardly over the imperforate side walls and communicating at their inner portions with the interior of the centrifugal basket, said channels having openings intermediate their ends establishing communication between the same and the interior of the basket, said channels being provided with conical shaped seepage outlets located outwardly beyond the inner faces of the imperforate side walls and extending downwardly below the upper edge of the cylindrical body and communicating at the top with the outer ends of the seepage channels.

31. In a centrifugal separating machine, a rotary centrifugal basket including a cylindrical body forming imperforate side walls and a top plate secured to the cylindrical body and having seepage channels extending outwardly over the imperforate side walls and communicating at their inner portions with the interior of the basket, the latter being provided with seepage outlets located beyond the inner face of the imperforate side walls and extending downwardly and outwardly at an inclination and flared toward their outer ends, said outlets communicating at their upper ends with the outer ends of the said seepage channels.

32. In a centrifugal separating machine, a rotary centrifugal basket comprising a cylindrical body portion forming imperforate side walls, a top plate arranged upon the cylindrical body and having a central opening and provided with an annular series of spaced fastening devices piercing the top plate and tapped into the body at the upper edge thereof, said top plate being provided with spaced, unobstructed, open-ended seepage channels located at the spaces between the fastening devices and having side walls extending between the latter from said central opening of the top plate to the periphery thereof, and a seepage plate fitted against the lower face of the top plate and secured between the same and the upper edge of the cylindrical body by the said fastening devices and establishing communication between said channels and the interior of the basket, the body forming a solid support for the seepage plate and stiffening the same to prevent the seepage plate from buckling under water pressure.

33. In a centrifugal separating machine, a casing, a rotary centrifugal basket arranged within the casing, scrapers operating within the basket and movable inwardly and outwardly with respect to the walls of the basket, arms connected with the scrapers, a slidable bar, a motor, mechanism actuated by the motor and operatively connected with the bar for sliding the same outwardly and inwardly, and means located at spaced points on the bar for operatively connecting the arms of the scrapers directly to the slidable bar for simultaneously moving the scrapers toward and from the side walls of the rotary centrifugal basket.

34. In a centrifugal separating machine, a casing, a rotary centrifugal basket arranged within the casing, spaced vertical shafts mounted in the casing and depending within the basket, horizontally swinging scrapers carried by the said shafts and movable outwardly and inwardly toward and from the side walls of the basket, lever arms extending from the upper ends of the vertical shafts exteriorly of the basket, a slidable bar connected at spaced points with the lever arms and located within the area of the casing, a motor, and means actuated by the motor and operatively connected with the slidable bar for simultaneously moving the scrapers toward and from the side walls of the basket.

35. In a centrifugal separating machine, a casing, a rotary centrifugal basket arranged within the casing, spaced vertical shafts mounted in the casing and depending within the basket, horizontally swinging scrapers carried by the said shafts and movable outwardly and inwardly toward and from the side walls of the basket, lever arms extending from the vertical shafts, a bar connected with the lever arms and movable backwardly and forwardly to oscillate the arms, a motor, and gearing actuated by the motor and having a screw connected to and movable backwardly and forwardly with the slidable bar for simultaneously swinging the scrapers inwardly and outwardly.

36. In a centrifugal separating machine, a rotary centrifugal basket, a hollow vertical shaft extending into the basket and forming a passage for a cleaning fluid medium, and a hollow horizontally swinging scraper mounted on the said shaft and extending substantially from the top to the bottom of the basket and forming an interior chamber communicating with the passage of the hollow shaft, said scraper being provided with an outlet communicating with the interior chamber for the discharge of a cleaning fluid medium delivered to the hollow scraper through the passage formed by the hollow shaft and means connected with the said shaft for swinging the scraper inwardly and outwardly.

37. In a centrifugal separating machine, a rotary centrifugal basket, a scraper operating within the centrifugal basket and movable inwardly and outwardly with respect to opposite walls of the basket and having interiorly arranged means for providing a passage for a cleaning fluid medium and provided also with an outlet for the discharge of the cleaning fluid medium, and means for conveying a cleaning fluid medium to the passage of the scraper.

38. In a centrifugal separating machine, a rotary centrifugal basket, a scraper operating within the rotary centrifugal basket and movable outwardly and inwardly with respect to opposite walls of the basket and provided with an interior chamber for the reception of a fluid cleaning medium and provided with a plurality of outlets for the discharge of the cleaning fluid medium, and means communicating with the interior of the hollow chamber for supplying a fluid cleaning medium under pressure to the said chamber from a point exteriorly of the basket.

39. A centrifugal separating machine including a casing, a rotary centrifugal basket within the casing, pivoted scrapers located within the basket and movable on a vertical axis toward and from the side walls of the basket, a relatively long, rigid slidable bar confined in movements within the area of the casing, means for guiding the bar in its sliding movements and for permitting the bar to move back and forth, means for operatively connecting the scrapers at spaced points with the sliding bar, said bar imparting pivotal movements to the scrapers when the bar moves, and mechanism for actuating the sliding bar and for controlling the movement of the scrapers toward and from the side walls of the basket.

40. A basket for centrifugal machines comprising an imperforate side wall composed of a continuous solid annular member provided at its upper and lower edges with exterior annular reinforcing ribs and a bottom member having an opening therein and also having an annular marginal flange embracing the lower annular reinforcing rib of the basket and secured thereto, and a top plate having a marginal flange embracing the upper exterior rib of the basket and secured thereto and also having a central opening, said top plate and said upper annular rib being provided with means for permitting seepage of liquid from the basket.

41. A basket for centrifugal machines comprising an imperforate vertical wall composed of a continuous solid annular member provided at its upper and lower edges with exterior annular reinforcing ribs, a bottom member having an opening therein and also having a marginal annular flange embracing the lower annular reinforcing rib of the vertical wall and secured thereto, a top plate having a marginal flange embracing the upper exterior rib of the vertical wall of the basket and having a central opening, said upper annular rib having downwardly and outwardly inclined outlets, said top plate being provided with channels extending inwardly from said outlets, and a screen means arranged over the lower face of the top plate to strain the effluent and permit seepage of the effluent through said channels and outlets during rotative movement of the basket.

42. A basket for centrifugal machines comprising an imperforate wall composed of a continuous solid annular member provided at its upper and lower edges with exterior annular reinforcing ribs, a bottom member having an integral, central, inwardly directed hub and a marginal retaining flange overlapping the lower annular reinforcing rib and secured thereto, the bottom member having an opening therein between the hub and the marginal flange thereof, a top plate disposed on the upper edge of the basket and having a marginal flange overlapping the upper reinforcing rib of the side wall of the basket and having a central opening, said top plate having radial channels therein, a perforated seepage plate disposed at the under side of the top plate to establish communication between the interior of the basket and said channels, and means for screening the openings in the seepage plate, the said upper rib having outwardly flared openings leading downwardly from said channels to effect discharge of separated liquid outwardly and downwardly of the basket during rotation of the latter.

43. In a centrifugal separating machine, a casing provided with a bearing support, a rotary centrifugal basket located directly over said bearing support and having a central opening in the top thereof and also having an opening in the bottom thereof, a shaft extending through the basket and being of a length substantially the vertical dimension of the basket, enclosed bearing means secured to one end of the shaft and removably mounted in said bearing support, enclosed bearing means secured to the upper end of the shaft and with the upper end of the shaft removably supported at the top of the basket against lateral movement whereby to mount the basket against undue vibration when rotating, curved cleaning scrapers swingingly mounted in the basket and insertable into the basket and removable therefrom through the opening in the top of the basket, means for folding and unfolding the scrapers with relation to the shaft and the side wall of the basket to unfold the same for cleaning the side wall of the basket and to fold same into substantially concentric relation with the shaft and bearings to permit removal of the folded scrapers and the shaft and bearings through the opening in the top of the basket, means for feeding material to the basket at opposite sides of the latter, and means connecting the feeding means and the scrapers and the means for operating the same together for removal and insertion as a unit into and from the basket through the opening in the top of the basket.

44. In a centrifugal separating machine, a casing provided with a bearing support, a rotary centrifugal basket located directly over said bearing support and having a central opening in the top thereof and also having an opening in the bottom thereof, a shaft extending through the basket and being of a length substantially the vertical dimension of the basket, enclosed bearing means secured to one end of the shaft and removably mounted in said bearing support, enclosed bearing means secured to the upper end of the shaft and with the upper end of the shaft removably supported at the top of the basket against lateral movement whereby to mount the basket against undue vibration when rotating, curved cleaning scrapers swingingly mounted in the basket and insertable into the basket and removable therefrom through the opening in the top of the basket, means for folding and unfolding the scrapers with relation to the shaft and the side wall of the basket to unfold the same for cleaning the side wall of the basket and to fold same into substantially concentric relation with the shaft and bearings to permit removal of the folded scrapers and the shaft and bearings through the opening in the top of the basket, means for feeding material to the basket at opposite sides of the latter, and means connecting the feeding means and the scrapers and the means for operating the same together for removal and insertion as a unit into and from the basket through the opening in the top of the basket, the basket and its shaft being removable and insertable from and into the casing as a unit.

45. In a centrifugal separating machine, a casing provided with an interior bearing support, a rotary centrifugal basket, a shaft extending through the basket and having its lower end mounted in said bearing support and at its upper end terminating at the top of the basket and journalled thereat against lateral movement and being of a length substantially the vertical dimension of the basket to rotatably mount the basket against undue vibration, a top plate for the basket having a central opening therein, means to rotate the basket, tubular members extending into the basket at opposite sides of said shaft and relatively close thereto for the supply of material to the basket at the bottom thereof for separation under the influence of centrifugal action incident to rotation of the basket, the basket having a discharge opening in the bottom thereof, pivotally mounted swinging curved scrapers to engage a wall of separated solids built up against the side wall of the basket incident to centrifugal action and to gradually cut away said built up wall of solids, means for connecting the scrapers and the tubular members together as a unitary assembly, means for swinging the scrapers outwardly for said cleaning action and to pull same inwardly into substantially concentric relation with said shaft with said tubular members disposed within the area of said concentric relation between the blades and the shaft and into a cross sectional area less than the area of the opening in the top of the basket so as to permit withdrawal of the tubular members and the scrapers as a unit through the opening in the top of the basket for servicing purposes.

46. In a centrifugal separating machine, a base, a casing supported on the base, a rotary centrifugal basket mounted in the casing, means for feeding material to the basket, high and low speed motors mounted on the base, a relatively short power shaft rotatable in one direction only and confined within the base and to the ends of which said motors are connected and disposed close to the casing at opposite sides thereof, means arranged intermediate the ends of the power shaft constituting the sole means for supporting the same, said power shaft being arranged relatively close to the bottom of the centrifugal basket and operatively connected to the basket to rotate the latter whereby the motors are closely coupled with relation to each other and with relation to the base and the basket.

47. In a centrifugal separating machine, a casing having a base, a rotary centrifugal basket arranged within the casing directly over and adjacent the base, motors mounted upon the base and located adjacent the bottom of the basket, and means including a single power shaft rotatable in one direction only and operatively connected with the basket at the bottom thereof for rotating the basket, overrunning clutches associated with said shaft and said motors for operatively connecting the motors with the basket, whereby the motors are close coupled to the basket and the latter may be rotated by either motor without manual operation of the connecting means.

48. In a centrifugal separating machine having a rotary centrifugal basket, basket cleaning mechanism including a slidable bar movable backwardly and forwardly and provided with a screw movable backwardly and forwardly therewith, means operatively connected with the screw for actuating the slidable bar and screw, a horizontally swinging scraper, and means for operatively connecting the scraper with the slidable bar.

49. In a centrifugal separating machine having a rotary centrifugal basket, basket cleaning mechanism including a slidable scraper actuating bar movable longitudinally forwardly and rearwardly and provided with a screw rigidly secured thereto at one end thereof for movement longitudinally therewith, spaced horizontally swinging scrapers provided with arms connected with the slidable bar, and means for actuating the slidable bar and screw longitudinally.

50. In a centrifugal separating machine, a rotary centrifugal basket including an annular wall, a hollow scraper operating within the centrifugal basket of a height substantially the vertical dimension of the basket and provided at its operating edge with a blade of a length the same as the length of the scraper, the scraper and the blade being movable inwardly and outwardly with respect to the annular wall of the basket, the hollow scraper having outlets opening outwardly adjacent the blade, and means for conveying a cleaning fluid medium to the hollow scraper for passage through said outlets to clean said blade and the annular wall of the basket.

51. A scraper for cleaning solids from the annular wall of a rotary centrifugal basket including a curved body provided with a hub portion and having an interior chamber and outlets leading from the chamber through the scraper at the operating edge thereof, the scraper having a fluid medium inlet at the inner end of said chamber.

52. A scraper for cleaning solids from the annular wall of a rotary centrifugal basket including a curved body provided with a hub portion and having an interior chamber and outlets leading from the chamber through the scraper at the operating edge thereof, the scraper having a fluid medium inlet at the inner end of said chamber, and a blade carried by the operating edge of the scraper adjacent which said outlets open outwardly from the chamber of the scraper.

53. In a centrifugal separating machine, a rotary centrifugal basket, and a horizontally swinging scraper operating within the basket and movable in an arc toward and from the side wall of the basket and provided with a passage for a fluid medium, said passage having an outlet at the operating edge of the scraper, whereby the fluid medium will act on the sludge and the scraper during the full arc described by the scraper.

54. In a centrifugal separating machine for separating sewage sludge or the like, a rotary centrifugal basket, a detachably secured-together sectional casing operatively enclosing the basket, means for feeding sludge to the basket, and a device and its operating means for removing dewatered sludge from the basket, one section of the casing having connected therewith the sludge feeding means and the sludge removing device and its operating means as a unit, whereby when said last mentioned section is detached or mounted it carries with it the sludge feeding device and the sludge removing device and its operating means as a unit.

55. In a centrifugal separating machine for separating sewage sludge or the like, a rotary centrifugal basket, a detachably secured-together sectional casing serving to operatively enclose the rotary basket and a device and operating means therefor for removing dewatered sludge from the basket, the casing comprising bottom, intermediate and top sections, the bottom section serving as a base for the other of said sections and as a detachable supporting means for the rotary basket, the intermediate section having operatively associated therewith the sludge removing device and its operating means as a unit, and the top section serving to enclose the operating means for the sludge removing device, whereby when the intermediate casing section is detached it and the sludge removing device and operating means therefor may be inserted and/or removed as a unit, and then the basket may also be inserted and/or removed as a unit from its detachable support in the bottom section.

56. In a centrifugal separating machine for separating sewage sludge or the like, a rotary centrifugal basket, a detachably secured-together exterior sectional casing serving to operatively enclose the basket, a device for feeding sludge to the basket and a unitary device and its operating means for removing dewatered sludge from the basket, the casing comprising bottom, lower intermediate, upper intermediate and top sections, the bottom section serving as a base and a support for the other of said sections and as a detachable support for the rotary basket, the lower intermediate section serving as a spacing means, the upper intermediate section being coupled with the sludge feeding device and the sludge removing device and its operating means to provide a unitary device, and the top section serving to enclose the operating means for the sludge removing device, whereby when the upper intermediate casing section is detached it and the sludge feeding device and the sludge removing device and operating means therefor may be inserted and/or removed as a unit, and then the basket may also be inserted and/or removed as a unit from its detachable support in the bottom section.

57. A hollow base for centrifugal separating machines including a side wall and having a discharge opening, flanged bracing elements rigid with the side wall and extending across the interior of the base at the upper portion thereof from the side wall of the base to the center of the base and thereat united and provided at the point of uniting with a bearing support, a gear case integral with the bearing support and depending therefrom in vertical alignment with the bearing support and having shaft bearings in side walls thereof, the side wall of the base having openings therein permitting access to the interior of the base.

58. A hollow base for centrifugal separating machines including a side wall and having a discharge opening, bracing elements rigid with the side wall and extending across the interior of the base at the upper portion thereof from the wall of the base to the center thereof and at the center united and provided thereat with a bearing support, a gear case integral with the bearing support and depending therefrom in vertical alignment therewith and having shaft bearings in side walls thereof, an oil tank, an oil pump suspended from the gear case in alignment therewith, and having communication with said oil tank, and with said gear case and operable to supply oil to the gear case, and means operating to actuate the pump to supply oil to the gear case from said tank, the side wall of the base having an opening therein to permit of access to the interior of the base.

59. In a centrifugal separating machine, a casing including a hollow base having a discharge outlet and also having openings in the side wall of the base, a rotary centrifugal basket in the casing, a relatively short vertical shaft to which the basket is secured, a rigid bearing support rigidly suspended within the base and provided with a depending gear case integral therewith and depending therefrom in vertical alignment therewith, the lower end of said vertical shaft being removably mounted in said bearing support, means at the upper end of the vertical shaft to rotatably support the upper end of the vertical shaft and maintain the same against lateral movement out of its true vertical axis of rotation to thereby prevent vibration and wobbling of the basket in operation, a single power shaft journalled intermediate its ends in said gear case and dependent for support solely by the gear case, a gear mechanism in the gear case operatively connecting said shafts, high and low speed motors operatively connected to the ends of the power shaft for driving the same at high and low speeds, including clutching devices having operative connection with the power shaft and motors to operate the motors to drive the basket at high and low speeds.

60. In a centrifugal separating machine, a casing including a rigid hollow base having a discharge outlet and also having openings in the side wall of the base, a rotary centrifugal basket in the casing, a relatively short vertical shaft to which the basket is secured, the shaft being of a length substantially the same as the vertical dimension of the basket and at its upper end terminating within the basket at the upper portion of the latter, means at the upper and lower ends of the vertical shaft for rotatably mounting the same against lateral movement out of a fixed vertical axis during rotation of the basket, a single power shaft rotatable in one direction only and located and confined within the base and operatively connected with the lower end of the vertical shaft adjacent the bottom of the basket to rotate the basket, high and low speed motors projecting at their inner ends into said openings in the side wall of the hollow base, and free wheeling devices mounted on the power shaft within the base and having operative connection with said motors to operate the motors to drive the basket at high and low speeds.

61. In a centrifugal separating machine, a casing having a hollow base, braces extending across the base at the upper portion thereof and integral with the same, said braces being provided with an integral bearing supporting ring extending above and below the braces, a substantially rectangular gear case integral with the bearing supporting ring and depending from the latter, said gear case being provided with side openings and a bottom opening, a rotary centrifugal basket arranged in the casing, a vertical shaft carrying the basket and extending through the bearing supporting ring into the gear case and having a bearing supported by the said ring, a horizontal shaft extending through the gear case and having bearings arranged in the side openings thereof, an oil pump suspended from the gear case at the bottom opening and provided with a gear located interiorly of the gear case, intermeshing gears connecting the said shafts, one of the gears meshing with the oil pump gear for operating the same, and means for connecting the oil pump with the gear case for lubricating the gears and bearings.

62. A centrifugal separating machine for dewatering materials including a rotary centrifugal basket, a vertical shaft on which the basket is mounted extending through the basket interiorly thereof from the bottom to the top of the basket and terminating at the top of the same, said basket being provided in its bottom adjacent the lower end of the shaft with an opening for the discharge of dewatered solids, a horizontal shaft below the rotary basket, gearing connecting the shafts, means operating through the said horizontal shaft and gearing for rotating the centrifugal basket at a high purging speed and a low cleaning speed including high and low speed motors, and a free wheeling device associated with the high speed motor whereby the high speed motor will be disconnected from the basket while the low speed motor is operating and the high speed motor will be enabled to pick up the speed of the basket when the high speed motor is put in operation.

63. In a centrifugal separating machine, a casing including a hollow base having an outlet, a bearing support located within the base, a rotary centrifugal basket in the casing and projecting into said base and having a substantially flat bottom disposed close to said bearing support, a short vertical shaft to which the basket is secured, said shaft terminating at its upper end within the basket, an enclosed bearing means carried at the lower end of said shaft below the basket bottom and removably mounted in said bearing support, an enclosed bearing means carried by the upper end of said shaft above the bottom of the basket whereby the enclosed bearings are arranged one within the basket and the other exteriorly thereof and separated by the substantially flat bottom of the basket, means for removably holding the upper enclosed bearing against lateral displacement whereby to maintain the basket shaft and basket on a substantially fixed vertical axis during rotation thereof to prevent lateral vibration of the shaft and basket during operation of the machine, the enclosures of said bearings shielding and protecting the bearings from foreign matter, and the basket, the shaft and the enclosed bearings being removable from the casing as a unit for servicing when said upper bearing holding means is removed without disturbing the normal relative alignment of the shaft, bearings or enclosures therefor.

64. In a centrifugal separating machine, a sectional casing including a hollow base, a lower bearing support rigid with and located within the base, an upper detachable bearing support normally constituting a fixed portion of the casing, a rotary centrifugal basket arranged within the casing between and closely adjacent to the upper and lower bearing supports and having a substantially flat horizontal bottom, a short vertical shaft rigid with the bottom of the basket and extending from the upper bearing support to the lower bearing support, and enclosed upper and lower bearings carried by the short vertical shaft at the ends thereof and located above and below the bottom of the basket and removably fitted in the upper and lower bearing supports in vertical alignment to maintain the basket and shaft on a fixed vertical axis during their rotary movment to prevent undue lateral vibration, said basket, shaft and bearings being removable as a unit without disturbing the normal alignment of the bearings with relation to the shaft and basket when the upper bearing support is detached from the casing.

65. In a centrifugal separating machine, a rotary centrifugal basket having imperforate side walls and liquid discharge means at its top and having a discharge opening in its bottom, means to rotate the basket at high and low speeds, the high speed rotation of the basket separating the liquids from the solids for discharge of the liquids at the top of the basket and building up a wall of solids on the imperforate side walls of the basket, a horizontally swinging scraper in the basket movable toward and away from the side walls of the basket for operation on the built up wall of solids to gradually work through the wall of solids to remove the solids wall gradually for discharge through the discharge opening in the bottom of the basket, and means operatively connected to the scraper for advancing the same toward and away from the side walls of the basket including a motor, a slidable bar and a screw rigidly connected to said bar and operatively connected to said motor, the screw and operative connection between the same and the motor being operative for locking and holding said scraper against acceleration or deceleration in the direction of its travel incident to impact of the scraper with the walls of the solids during operation of removal of the wall of solids from the basket.

66. In a centrifugal separating machine, a rotary centrifugal basket having imperforate side walls and having a liquid discharge means at its top and a discharge opening in its bottom, means to rotate the basket to build up a wall of solids against the imperforate side walls of the basket, means in the basket movable toward and away from the side walls of the basket for operation on the built up wall of solids to gradually work through said wall of solids to gradually remove the wall of solids from the side walls of the basket for discharge through the discharge opening in the bottom of the basket, and means operatively connected to the solids removing means for operating the latter including a motor, a movable bar and a screw rigidly connected to said bar and operatively connected to said motor for positively locking said solids wall removing means against acceleration or deceleration in the direction of its travel of movement incident to impact of said solids removing means with the wall of solids during the operation of removal of the solids from the basket.

67. In a centrifugal separating machine, a rotary centrifugal basket having imperforate side walls and seepage means at its top and a discharge opening in its bottom, means to rotate the basket at high and low speeds to separate the liquids from the solids for discharge of the former through the seepage means at the top of the basket and to build up a wall of solids on the imperforate side walls of the basket, the high speed rotation of the basket effecting the separation of the liquids from the solids for discharge through the seepage means, means in the basket movable toward and away from the side walls of the basket to work gradually through the wall of solids to remove the solids wall for discharge through the discharge opening of the basket, means operatively connected to the solids removing means for operating the latter during low speed rotation of the basket including a slidable bar movable backwardly and forwardly and provided with a screw disposed in alignment therewith and movable backwardly and forwardly with the bar, an interiorly threaded sleeve coacting with said screw, and means including a motor having operative connection with said sleeve for actuating the screw and bar, the screw and sleeve coacting to provide a locking means to maintain the said removing means against acceleration or deceleration in the movement of same incident to impact of the latter with the wall of solids during the operation of removal of the wall of solids from the basket.

68. In a centrifugal separating machine for operating upon sludge material, a rotary centrifugal basket, means for rotating the basket, means including a pipe for feeding materials to the bottom of the basket and having a discharge end disposed radially of the basket with the discharge end of the pipe contracted vertically and distended laterally to spread the material over the bottom of the basket for separation in the basket incident to centrifugal action, and means for introducing chemicals and other sludge treating substances into the feed pipe prior to the delivery of the material to the bottom of the basket whereby turbulence of the material in the basket causes a thorough commingling of the sludge treating substances with the sludge material prior to separation of the liquid and solids, purifying the separated liquid.

69. In a centrifugal separating machine, a rotary centrifugal basket having an annular top structure provided with spaced channels extending from the inner edge of the top structure to the outer edge thereof, said top structure having spaced sets of rows of openings, one set at the bottom of each channel, to establish communication between the interior of the basket and the channels, the openings of each row of each set being located opposite the spaces between the openings of an adjacent row of openings so as to provide for a continuous discharge of seepage from the basket through the channels during rotation of the basket.

70. A centrifugal separating machine for dewatering solids including a vertically disposed rotary centrifugal basket having imperforate side walls against which a wall of solids is gradually built up incident to centrifugal force due to rotation of the basket, seepage means spaced substantially from the bottom of the basket and extending inwardly radially a distance from the side walls of the basket throughout substantially the dimension of the solids walls zone and including openings inclined upwardly and outwardly toward the periphery of the basket to effect continuous seepage of liquids from the basket through the seepage means throughout the entire impacting operation, and means for rotating the basket.

71. In a centrifugal separating machine including a rotary centrifugal basket having an imperforate peripheral wall against which a cake of solids is built up under the centrifugal force of rotation, spaced members extending inwardly from said wall throughout the periphery thereof, one of said members having seepage means arranged radially continuous from the peripheral wall of the basket inwardly of the basket throughout a substantial radial dimension of the cake and including openings inclined upwardly and outwardly toward the periphery of the basket for continuously discharging liquid from the cake throughout the entire operation.

72. In a centrifugal separating machine including a rotary centrifugal basket having an imperforate side wall against which a cake of solids is built up under the centrifugal force of rotation, a top for the basket provided with liquid discharge channels open at opposite ends and having seepage openings at the bottoms thereof arranged radially continuous from the peripheral wall of the basket inwardly of the basket throughout a substantial radial dimension of the cake for continuously discharging liquid from the cake throughout the entire impacting operation, and means for rotating the basket to separate liquids from the solids to discharge the separated liquids through the channels.

73. In a centrifugal separating machine, including a rotary centrifugal basket having imperforate side walls against which a cake of solids is built up under the centrifugal force of rotation, spaced members extending inwardly continuously from said side walls, one of said members having radially continuous seepage means extending in a radial direction throughout a substantial radial dimension of the cake for the passage of liquid through the seepage means axially of the cake at all radial points within the area of the seepage means.

74. A centrifugal separating machine including a rotatable centrifugal basket, and a horizontally swinging hollow scraper operating within the basket extending substantially from the top to the bottom of the centrifugal basket and forming an interior chamber and movable into the path of dewatered sludge and provided at the outer portion with cutting means for cutting sludge from the basket, said scraper being provided with a fluid passage leading to the said chamber and having a discharge outlet at the outer portion thereof adjacent the cutting means thereof for cleaning the latter and the inside periphery of the basket.

75. A centrifugal separating machine including a rotary centrifugal basket having imperforate side walls against which a wall of solids is gradually built up incident to centrifugal force due to rotation of the basket, an end structure for the basket having channels which open at their outer ends adjacent the side walls of the basket for the discharge of liquids separated from the solids during rotation of the basket, means providing communication between the interior of the basket and the channels, said communication means extending radially continuously from the imperforate side walls of the basket to substantially the inner ends of the respective channels to provide for continuous discharge of the separated liquids through the channels from within the basket throughout the entire impacting operation.

JOSEPH S. PECKER.

CERTIFICATE OF CORRECTION.

Patent No. 2,056,885.     October 6, 1936.

JOSEPH S. PECKER.

It is hereby certified that error appears in the printed specification of the above numbered patent requiring correction as follows: Page 10, first column, line 51, claim 15, for the words "bearing ring and gear case" read latter; line 52, same claim, after "shielded" insert on both sides of the bearing ring and gear case; page 11, first column, line 33, claim 24, after "machine" insert the comma and words , a rotary centrifugal basket; and that the said Letters Patent should be read with these corrections therein that the same may conform to the record of the case in the Patent Office.

Signed and sealed this 22nd day of December, A. D. 1936.

Henry Van Arsdale (Seal)     Acting Commissioner of Patents.